(12) United States Patent
Chun et al.

(10) Patent No.: US 12,537,014 B2
(45) Date of Patent: Jan. 27, 2026

(54) SYSTEMS AND METHODS FOR IMPROVED GROUP COMMUNICATION SESSIONS

(71) Applicant: QUALCOMM Incorporated, San Diego, CA (US)

(72) Inventors: Miran Chun, San Diego, CA (US); Michael Franco Taveira, San Diego, CA (US); Paul Torres, San Diego, CA (US); Vinesh Sukumar, Fremont, CA (US); Joel Linsky, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 17/678,873

(22) Filed: Feb. 23, 2022

(65) Prior Publication Data
US 2023/0282224 A1    Sep. 7, 2023

(51) Int. Cl.
*G10L 21/0232* (2013.01)
*G10L 21/0208* (2013.01)
(Continued)

(52) U.S. Cl.
CPC .......... *G10L 21/0232* (2013.01); *G10L 25/60* (2013.01); *H04R 1/406* (2013.01); *H04R 3/005* (2013.01); *G10L 21/0208* (2013.01); *G10L 2021/02165* (2013.01); *G10L 2021/02166* (2013.01); *H04M 3/568* (2013.01); *H04R 2410/01* (2013.01)

(58) Field of Classification Search
CPC ................. G10L 21/0232; G10L 25/60; G10L 2021/02166; G10L 21/0208; G10L 2021/02165; H04R 1/406; H04R 3/005; H04R 1/326; H04R 2410/01; H04M 3/568; H04M 3/2236; H04M 3/56; H04M 3/564; G10K 11/178
See application file for complete search history.

(56) References Cited

U.S. PATENT DOCUMENTS 10,262,674 B1 * 4/2019 Wurmfeld ........... G10L 21/0208
10,529,336 B1    1/2020 Matthews et al.
(Continued)

FOREIGN PATENT DOCUMENTS

CN    112735462 A  *  4/2021
EP    3070876 A1  *  9/2016
EP    3257236 A1     12/2017

OTHER PUBLICATIONS

International Search Report and Written Opinion—PCT/US2023/013236—ISA/EPO—Apr. 18, 2023.

*Primary Examiner* — Carolyn R Edwards
*Assistant Examiner* — Kuassi A Ganmavo
(74) *Attorney, Agent, or Firm* — QUALCOMM Incorporated

(57) ABSTRACT

Systems and techniques are provided for processing audio data. For instance, a process can include obtaining a primary audio signal from a user computing device and obtaining first audio data from an additional computing device, wherein the additional computing device is within an auditory range of the user computing device. The primary audio signal can be filtered to generate a filtered primary audio signal. The filtering can include removing a representation of the first audio data from the primary audio signal. The filtered primary audio signal can be output to a network-based meeting.

30 Claims, 10 Drawing Sheets

(51) Int. Cl.
*G10L 21/0216* (2013.01)
*G10L 25/60* (2013.01)
*H04M 3/56* (2006.01)
*H04R 1/40* (2006.01)
*H04R 3/00* (2006.01)

(56) References Cited

U.S. PATENT DOCUMENTS

| | | | |
|---|---|---|---|
| 11,705,101 B1* | 7/2023 | Morishima | G10K 11/17873 |
| | | | 381/71.12 |
| 11,909,786 B2 | 2/2024 | Chun et al. | |
| 2005/0078613 A1* | 4/2005 | Covell | H04L 65/1101 |
| | | | 370/260 |
| 2005/0259803 A1* | 11/2005 | Khartabil | H04M 3/564 |
| | | | 709/204 |
| 2006/0164508 A1 | 7/2006 | Eshkoli et al. | |
| 2009/0109961 A1* | 4/2009 | Garrison | H04M 3/564 |
| | | | 370/352 |
| 2009/0168984 A1* | 7/2009 | Kreiner | G06F 3/165 |
| | | | 379/202.01 |
| 2011/0225013 A1* | 9/2011 | Chavez | G06Q 10/109 |
| | | | 704/235 |
| 2012/0128146 A1* | 5/2012 | Boss | H04M 3/564 |
| | | | 379/202.01 |
| 2013/0040572 A1* | 2/2013 | Berrett | H04W 4/023 |
| | | | 455/41.2 |
| 2013/0044893 A1* | 2/2013 | Mauchly | H04N 7/15 |
| | | | 381/92 |
| 2014/0104374 A1 | 4/2014 | Buckler | |
| 2014/0254816 A1* | 9/2014 | Kim | G10L 21/0216 |
| | | | 381/71.11 |
| 2016/0050491 A1* | 2/2016 | Ahgren | H04B 3/23 |
| | | | 381/66 |
| 2016/0189726 A1* | 6/2016 | Raniwala | G06F 3/165 |
| | | | 704/227 |
| 2016/0308929 A1* | 10/2016 | Fu | H04L 65/80 |
| 2017/0085985 A1* | 3/2017 | Kim | G06F 3/16 |
| 2018/0063479 A1 | 3/2018 | Nimri et al. | |
| 2018/0098027 A1* | 4/2018 | Lubelsky | G06T 5/50 |
| 2018/0139413 A1 | 5/2018 | Diao | |
| 2018/0278890 A1* | 9/2018 | Krantz | H04N 7/147 |
| 2018/0337968 A1* | 11/2018 | Faulkner | H04L 51/046 |
| 2022/0093101 A1* | 3/2022 | Krishnan | G10L 15/24 |
| 2022/0191259 A1 | 6/2022 | Leppänen et al. | |

\* cited by examiner

SYSTEMS AND METHODS FOR IMPROVED GROUP COMMUNICATION SESSIONS

TECHNICAL FIELD

The present disclosure generally relates to providing communication sessions to remote and in-person participants. For example, aspects of the present disclosure include detecting private conversations and/or removing background noise for one or more participants in a communication session.

BACKGROUND

Hybrid meetings can be meetings with one or more in-person participants and one or more remote participants. For example, in-person participants can be located together in one or more physical spaces, such as an office, a conference room, or a meeting room. In some cases, remote participants can be located in one or more locations that are different than the physical space(s) associated with in-person participants. For example, remote participants may be working from home and attend a hybrid meeting from their home office or bedroom. Remote participants may attend or participate in a hybrid meeting using a personal computing device, which can include but is not limited to a desktop computer, a laptop computer, a tablet computer, a smartphone or other mobile computing device, etc.

Hybrid meetings increase in popularity as organizations and individuals alike expect to see increased work-from-home opportunities. While existing hybrid meeting approaches may permit participation from both in-person and remote participants, these solutions are often not designed with remote participants in mind and can result in remote participants feeling disadvantaged or having a lower quality experience than their in-person colleagues.

SUMMARY

In some examples, systems and techniques are described for removing background noise from one or more audio streams associated with a participant in a hybrid meeting. According to at least one illustrative example, a method is provided for processing audio data, the method including: obtaining a primary audio signal from a user computing device; obtaining first audio data from an additional computing device within an auditory range of the user computing device; filtering the primary audio signal to generate a filtered primary audio signal, wherein the filtering includes removing a representation of the first audio data from the primary audio signal; and outputting the filtered primary audio signal to a network-based meeting.

In another example, an apparatus for processing audio data is provided that includes a memory (e.g., configured to store data, such as virtual content data, one or more images, etc.) and one or more processors (e.g., implemented in circuitry) coupled to the memory. The one or more processors are configured to and can: obtain a primary audio signal from a user computing device; obtain first audio data from an additional computing device within an auditory range of the user computing device; filter the primary audio signal to generate a filtered primary audio signal, wherein the filtering includes removing a representation of the first audio data from the primary audio signal; and output the filtered primary audio signal to a network-based meeting.

In another example, a non-transitory computer-readable medium is provided that has stored thereon instructions that, when executed by one or more processors, cause the one or more processors to: obtain a primary audio signal from a user computing device; obtain first audio data from an additional computing device within an auditory range of the user computing device; filter the primary audio signal to generate a filtered primary audio signal, wherein the filtering includes removing a representation of the first audio data from the primary audio signal; and output the filtered primary audio signal to a network-based meeting.

In another example, an apparatus for processing audio data is provided. The apparatus includes: means for obtaining a primary audio signal from a user computing device; means for obtaining first audio data from an additional computing device within an auditory range of the user computing device; means for filtering the primary audio signal to generate a filtered primary audio signal, wherein the filtering includes removing a representation of the first audio data from the primary audio signal; and means for outputting the filtered primary audio signal to a network-based meeting.

In some aspects, one or more of the apparatuses described above is or is part of a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, an apparatus includes a camera or multiple cameras for capturing one or more images. In some aspects, the apparatus further includes a display for displaying one or more images, notifications, and/or other displayable data. In some aspects, the apparatus can include one or more sensors, which can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures.

DETAILED DESCRIPTION

Figure 1:
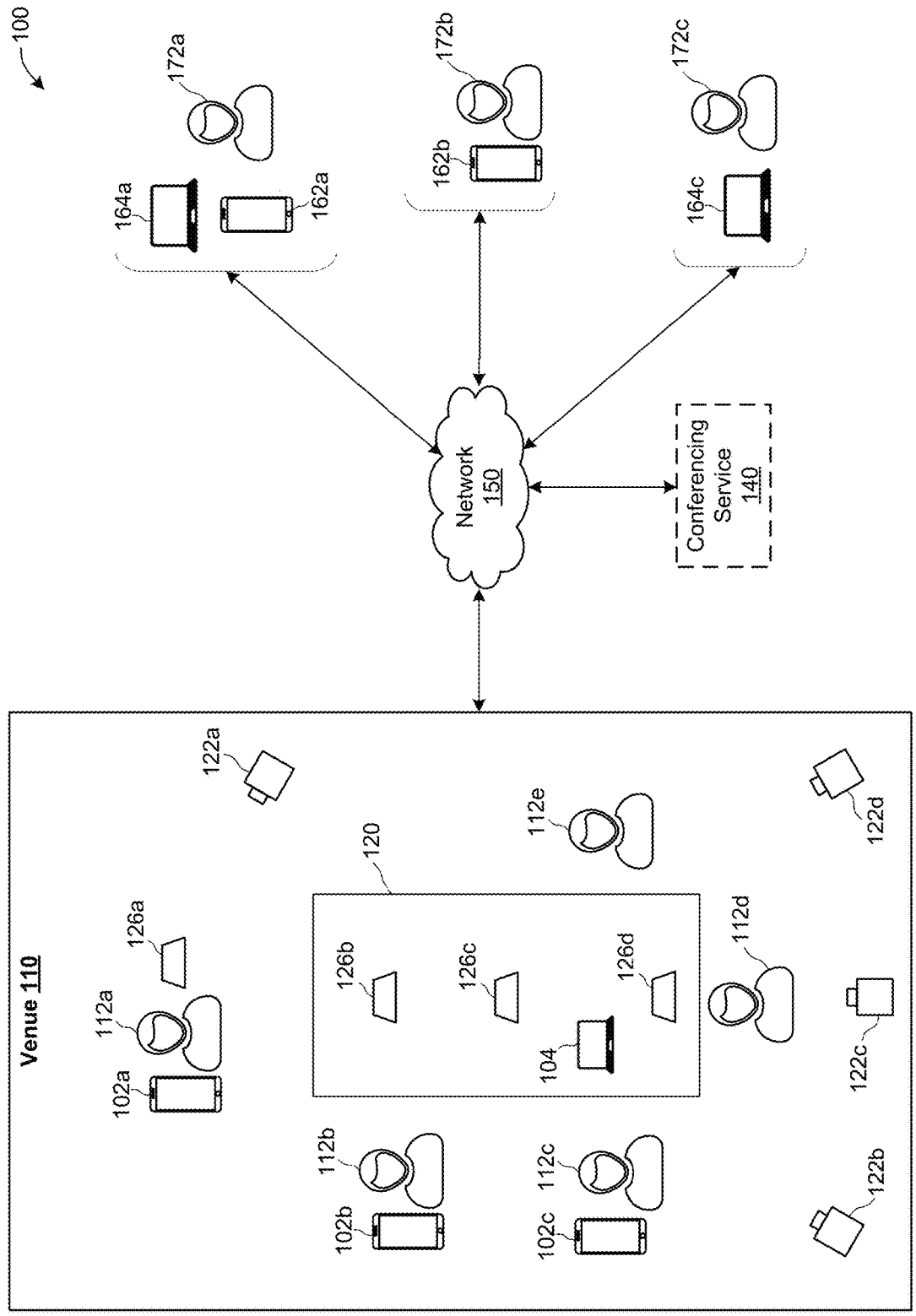
FIG. 1 is a block diagram illustrating an example of a hybrid meeting system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As noted previously, hybrid meetings may include one or more in-person participants and one or more remote participants. The in-person participants can be located together in one or more physical spaces (e.g., in an office, a conference room, a meeting room, etc.), and remote participants can be located in one or more locations that are different than the physical space(s) associated with in-person participants. For example, a remote participant may be working from home and may attend a hybrid meeting from their home office or bedroom. Remote participants may attend or participate in a hybrid meeting using a personal computing device, which can include but is not limited to a desktop computer, a laptop computer, a tablet computer, a smartphone or other mobile computing device, etc.

In some examples, in-person participants can attend or participate in a hybrid meeting using one or more computing devices provided in a conference room or other physical space in which the in-person participants are located. For example, a conference room can include one or more video cameras, microphones, sensors, etc., the inputs and/or outputs of which are provided to a conferencing system or conferencing service used to provide the hybrid meeting. In some cases, one or more in-person participants can attend or participate in a hybrid meeting using one or more computing devices that are the same type as or similar to the computing device(s) used by remote participants. For example, an in-person participant can carry a laptop computer, smartphone, mobile computing device, etc., into a conference room that is equipped with video cameras and microphones. Video data, audio data, sensor data, and/or other data can be obtained from the computing devices associated with in-person participants and can be obtained from the video cameras, microphones, sensors, and/or computing devices associated with the conference room.

Hybrid meetings may become a more frequent form of meeting type as increased work-from-home opportunities are presented for organizations and individuals. While existing hybrid meeting approaches may permit participation from both in-person and remote participants, these solutions are often not designed with remote participants in mind and can result in remote participants feeling disadvantaged or having a lower quality experience than their in-person colleagues. In some cases, in-person participants of hybrid meetings can face challenges when interacting with (or attempting to interact with) one or more remote participants. For example, in-person participants may have difficulty in quickly ascertaining the identity or identities of remote participants in a hybrid meeting and may chose not to interact with remote participants due to this uncertainty. In some examples, in-person participants in a hybrid meeting may be unaware of and/or unable to easily participate in text-based conversations that take place between remote participants during the hybrid meeting.

Remote participants in hybrid meetings can face different challenges, many of which become more pronounced as the size of the meeting increases (e.g., as the total number of participants, both in-person and remote, increases). In some cases, these challenges can arise because remote participants are typically presented with a fixed view into the physical meeting room and are often offered fixed opportunities to speak or interact. For example, many distinct conversations can occur during a hybrid meeting, often in simultaneous fashion. In-person participants may be able to selectively participate in secondary conversations while still listening to the primary conversation, but remote participants often cannot.

For example, a remote participant's experience of a hybrid meeting can be limited to the video or audio feeds that are made available. In some examples, a remote participant may be unaware of the existence of any ongoing secondary conversations, and therefore cannot participate in a secondary conversation. In some examples, a remote participant may be aware of the existence of an ongoing secondary conversation but can only listen to the primary conversation, with little to no ability to hear or participate in a secondary conversation.

Secondary conversations can often be relevant to the primary conversation and/or certain meeting participants. Secondary conversations may be relevant to a remote participant, in which case the remote participant's experience can suffer due to being unaware of or unable to participate in the secondary conversation. In some cases, ongoing secondary conversations can interfere with a remote participant's ability to hear the primary conversation (e.g., when a secondary conversation occurs closer to the microphone used to provide audio to the remote participant, the secondary conversation may overpower the audio of the primary conversation that is also detected using the same microphone).

Systems and techniques are needed to more effectively provide hybrid meetings for either or both in-person and remote participants, for example by automatically detecting secondary conversations, determining a private or non-private status of secondary conversations, and providing remote participants with selective focus between a primary conversation and non-private secondary conversations.

In some examples, the presence of background noise in a remote participant's audio data can interfere with other meeting participants' ability to hear and understand the remote participant (e.g., causing the remote participant to repeat themselves and/or causing the remote participant's questions and contributions to the meeting to be ignored). In some examples, a remote participant may be hesitant to speak or participate in a hybrid meeting when the remote participant is located in a noisy environment or near a source of background noise. Systems and techniques are needed to accurately and efficiently filter or remove remote background noise from one or more audio streams associated with participants in a hybrid meeting.

Systems, apparatuses, processes (also referred to as methods), and computer-readable media (collectively referred to as "systems and techniques") are described herein for processing audio data, video data, and/or sensor data associated with a hybrid meeting. As noted above, a hybrid meeting can be a meeting that includes a plurality of in-person participants and at least one remote participant. In some examples, the systems and techniques described herein can be used to detect multiple simultaneous conversations and, from the detected conversations, identify a primary conversation and one or more secondary conversations. A secondary conversation can be identified as private or non-private, based on one or more cues and/or gestures associated with the secondary conversation. In some cases, the one or more cues can be based on audio data, video or image data, and/or sensor data. In some examples, the systems and techniques described herein can be used to filter or remove background noise from one or more audio streams associated with a participant in a hybrid meeting.

In some cases, a primary conversation can be detected as originating from a main speaker who is participating in the hybrid meeting. In some examples, a primary conversation can be detected based on an identification of the participant who is currently speaking in the hybrid meeting. Identification of a participant can be performed in real-time, can be based on pre-determined information, or can be based on some combination of the two. A primary conversation can include speech from a single participant such as a moderator or presenter. A primary conversation can include speech from multiple participants, such as in a group meeting where participants take turns speaking, in a presentation with a moderator who opens the floor for questions or discussion, etc.

In some cases, a secondary conversation (also referred to as a "side conversation") can be identified as occurring between two or more in-person participants while the primary conversation is taking place. In some examples, a secondary conversation can occur simultaneously with the primary conversation. In some cases, a secondary conversation can occur asynchronously with the primary conversation. For example, a secondary conversation can occur during pauses in the main speaker's speech (e.g., the primary conversation). Distinct conversations and/or voices can be detected and analyzed to determine whether a primary conversation or secondary conversation identifier is appropriate. In the case of secondary conversations, a determination can also be made as to whether the speech belongs to an existing (or resumed) secondary conversation or if it represents a new secondary conversation. Additionally, the conversation or voice identified as belonging to the primary conversation or speaker, respectively, can change over the course of the meeting (e.g., a person asking a question to the presenter may be considered part of the primary conversation; people may take turns being the main speaker based on an agenda, etc.).

In some examples, a secondary conversation can be identified as occurring between at least one in-person participant and at least one remote participant while the primary conversation is taking place. For example, a secondary conversation can occur between an in-person participant and a remote participant who are attending the same hybrid meeting. In some cases, a secondary conversation can be identified as occurring between at least one in-person participant of a hybrid meeting and at least one remote individual who is not a participant in the hybrid meeting. In some examples, a secondary conversation between an in-person participant of a hybrid meeting and a remote non-participant can occur via a secondary channel (e.g., via phone, via a network-connected meeting application used to provide the hybrid meeting, etc.)

The systems and techniques described herein can be used to provide a remote participant interface that includes selectable options between a primary conversation and one or more secondary conversations identified as non-private. In some examples, the selectable options can provide remote participants with selective focus between the primary conversation and any non-private secondary conversations. The selective focus can include ignoring, muting, filtering, removing or otherwise deemphasizing non-selected conversations.

In some examples, a secondary conversation can be identified as non-private or private based on one or more detected gestures and/or cues that are performed by or otherwise associated with a participant in the secondary conversation. The detected gestures and/or cues can include a body position or a body orientation of a participant in the secondary conversation. For example, if a secondary conversation participant turns his face or body to be oriented in a direction facing away from the primary conversation, or covers his mouth with his hand, then the secondary conversation can be identified as private. In some cases, detected cues can be determined from one or more audio signals associated with the secondary conversation (e.g., keywords spoken by a participant in the secondary conversation, a language or change in language used, a volume level or change in volume level of the secondary conversation, a change in speaking cadence, etc.).

In one illustrative example, a secondary conversation can be identified as non-private based on a determination that at least one detected gesture or cue associated with the secondary conversation is inconsistent with a private status previously assigned to the secondary conversation. For example, in some cases a secondary conversation can be identified as having transitioned from private to non-private by analyzing subsequent gestures or cues against earlier gestures or cues, e.g., where the earlier gestures or cues are ones that triggered the prior identification of the secondary conversation as being private. For example, if a secondary conversation participant leans in and covers her mouth, then the secondary conversation can be initially identified as private. If subsequently, the secondary conversation participant is detected as no longer leaning in and/or removing the hand covering her mouth, such an action can be identified as inconsistent with the earlier gesture and the secondary conversation can be identified as having transitioned from a private status to a non-private status.

In some cases, a secondary conversation identified as having transitioned from a private status to a non-private status can be associated with the new non-private status until a pre-determined amount of time elapses. For example, the secondary conversation can be associated with the new non-private status for one minute before reverting to its previous, private status. In some cases, the pre-determined amount of time can be measured from the point in time when the inconsistent gesture or cue was performed (e.g., the detected gesture or cue inconsistent with the private status previously assigned to the secondary conversation). In some examples, a secondary conversation identified as having transitioned from a private status to a non-private status can remain associated with the new non-private status until a subsequent trigger is detected or identified. In some cases, the subsequent trigger can include at least one detected gesture or cue that is inconsistent with the non-private status.

In some examples, a remote participant can use selectable options provided in a remote participant interface to selectively focus on a desired one of a primary conversation and one or more secondary conversations that were identified as non-private. In some cases, audio and/or video data of a secondary conversation can be automatically muted or excluded from an output associated with the hybrid meeting based on identifying the secondary conversation as private. In some cases, audio and/or video data of a secondary conversation can be automatically included in an output associated with the hybrid meeting based on identifying the secondary conversation as non-private.

The systems and techniques described herein for processing audio data, video data, and/or sensor data associated with a hybrid meeting can be used to filter or remove background noise from one or more audio streams associated with a participant in a hybrid meeting. For example, background noise can be filtered or removed from an audio stream captured by a microphone associated with a remote participant in a hybrid meeting. In some cases, a first microphone captures audio data of the remote participant speaking and provides the captured audio data as an input to the hybrid meeting. The first microphone can be included on or attached to a user computing device that the remote participant uses to join the hybrid meeting (e.g., a desktop or laptop computer, a tablet, a smartphone, etc.).

In one illustrative example, at least one second microphone is identified within an auditory range of the remote participant and/or the first microphone on the remote participant's computing device. In some cases, the second microphone can be included on or attached to an additional computing device that is located in the surrounding environment of the remote participant. For example, the remote participant's computing device and the additional computing device can be located in the same room (e.g., the room where the remote participant joins the hybrid meeting from). In some examples, the remote participant's computing device and/or the first microphone may be associated with the hybrid meeting and the additional computing device(s) and/or second microphone(s) may not be associated with the hybrid meeting.

In one illustrative example, the one or more additional computing devices may be associated with the remote participant's computing device, but not associated with the hybrid meeting. For example, the remote participant's computing device can detect or otherwise communicate with one or more additional computing devices that are within a pre-determined range or distance from the remote participant's computing device. In some cases, the remote participant's computing device can automatically perform a discovery process to locate and/or communicate with one or more additional computing devices that are within range of the remote participant's computing device. In some examples, the remote participant's computing device can be located in the same area as or within some proximity to one or more additional computing devices. For instance, the remote participant may use his mobile phone to attend a hybrid meeting while driving his children to school. If the remote participant's children are using tablet computers while in the car, the remote participant's mobile phone (e.g., the remote participant's computing device) can detect, discover, or otherwise communicate with the tablet computers. In this example, the remote participant's mobile phone (e.g., the remote participant's computing device) can be associated with the hybrid meeting, while the children's tablet computers (e.g., additional computing devices) can be associated with the remote participant's mobile phone but not associated with the hybrid meeting.

In some cases, background noise filtering and/or removal can be performed for the primary audio signal captured by the remote participant's computing device by analyzing the primary audio signal against a reference audio data of background sound captured by the additional computing device.

For example, based on an auditory range or auditory proximity between the remote participant's computing device and the additional computing device, a background sound that is partially detected by the first microphone on the remote participant's computing device can also be detected by the second microphone on the additional computing device, and vice versa. Portions of the primary audio signal that match or are otherwise similar portions of the reference audio data of background sound likely represent background noise and can be filtered out or removed from the primary audio signal. In some cases, the background sound removal can be based at least in part on the loudest portions of the reference audio data from the additional computing device. For example, background sound may be louder as detected at the additional computing device than at the remote participant's computing device, because the source of the background sound may be in closer proximity to the additional computing device than to the remote participant's computing device.

In another illustrative example, background noise may be generated by the additional computing device. For example, if the additional computing device is a tablet or smartphone in the same room as the remote participant, a ringtone or notification played by the additional computing device could be background noise that is partially detected in the primary audio of the remote participant. In some cases, background noise generated by the additional computing device can include music or sound effects associated with a game, movie, or other audio and/or audiovisual content being output on the additional computing device. In some examples, the additional computing device can provide the remote participant's computing device with reference audio data of any sounds that are being output, or will shortly be output, by the additional computing device. For example, the reference audio data received by the remote participant's computing device can include a copy or indication of an audio data file that is also being output by a speaker of the additional computing device. Based on the received audio data file or other reference audio data from the additional computing device, the remote participant's computing device can filter out or remove background noise generated by one or more additional computing devices within an auditory range of the remote participant's computing device.

Various aspects of the systems and techniques described herein will be discussed below with reference to the figures. FIG. 1 is a block diagram illustrating an example of a hybrid meeting system 100. As depicted in FIG. 1, the hybrid meeting system 100 includes a plurality of in-person meeting participants 112a-112e that are physically located in a venue 110. As will be explained in greater depth below, venue 110 can be a conference room, a meeting room, or other physical space or location where the in-person meeting participants 112a-112e gather to attend a hybrid meeting provided by hybrid meeting system 100. Although a single venue 110 is depicted in FIG. 1, it is noted that a greater number of venues or other physical spaces can be utilized to provide a hybrid meeting for in-person participants without departing from the scope of the present disclosure. Also shown in FIG. 1 are one or more remote meeting participants 172a-172c, each or some of which may be located at different respective locations. It is noted that a greater or lesser number of remote participants than the three remote participants 172a-c can attend a hybrid meeting provided by hybrid meeting system 100 without departing from the scope of the present disclosure. Remote participants 172a-c can attend the hybrid meeting via communication links with a network 150, which can include or provide a hybrid meeting conferencing service 140. The network 150 can be any wired or wireless network including, but not limited to, a WiFi network; a cellular network, such as a 5G or Long-Term Evolution (LTE) network; an intranet; a wireless local area network (WLAN); a Bluetooth network or other personal area network (PAN); any combination thereof and/or other communication networks.

Venue 110 can be a conference room, meeting room, or other physical space where in-person participants 112a-e gather and attend a hybrid meeting provided by hybrid meeting system 100. In some cases, venue 110 can include one or more cameras or other video capture devices. For example, as depicted in FIG. 1, venue 110 may include video cameras 122a, 122b, 122c, and 122d (referred to as 122a-122d), arranged around venue 110 to capture different views of the in-person participants 112a-e and primary and/or secondary conversations therebetween. For purposes of illustration and example, four video cameras 122a-d are shown, but it is noted that a greater or lesser number of video cameras or other video and image capture devices can also be utilized. In some examples, one or more of the video cameras 122a-d can be adjustable to capture different views of venue 110 and/or one or more of the in-person participants 112a-e. As will be explained in greater depth below, in some aspects, one or more of the video cameras 122a-d can be automatically panned, tilted, zoomed, or otherwise adjusted to capture a field of view associated with a detected primary or secondary conversation amongst the in-person participants 112a-e.

In-person participants 112a-e are shown in various locations within venue 110. For example, venue 110 can include a table 120 around which one or more of the in-person participants are seated during the hybrid meeting. In some cases, one or more of the in-person participants 112a-e can be automatically localized within venue 110 and/or with respect to other in-person participants. For instance, localization of in-person participants 112a-e can be based at least in part on video or image data captured by the video cameras 122a-d, using, for example, the video or image data as input to one or more computer vision systems, object detection or tracking systems, etc. In some examples, in-person participants 112a-e can be localized in real-time.

In addition to video cameras 122a-d, venue 110 can be further provided with one or microphones 126a-d. In some examples, one or more of the microphones 126a-d can be included in a teleconferencing device or base station that includes additional sensors and/or processors for providing a hybrid meeting and implementing the systems and techniques described herein. For example, some or all of the microphones 126b-d shown in FIG. 1 as being located on the table 120 can be integrated into tabletop teleconferencing devices or base stations. In some examples, one or more of microphones 126a-d can be standalone microphones that are communicatively coupled to a computing device or other receiver associated with hybrid meeting system 100.

As will be explained in greater depth below, one or more of the microphones 126a-d can be used to localize the in-person participants 112a-e within venue 110. In some examples, the localization of in-person participants 112a-e can be based on a combination of audio data from microphones 126a-d and visual data from cameras 122a-d. Audio data from microphones 126a-d can also be used to determine the identities of in-person participants 112a-e, for example based on voice recognition, voice fingerprinting, keyword detection and analysis, natural language processing (NLP), etc.

In some examples, microphones 126a-d and video cameras 122a-d can be associated with venue 110 in a permanent or semi-permanent manner. For example, one or more of microphones 126a-d and/or video cameras 122a-d can be installed or otherwise arranged in fixed locations within venue 110. The fixed locations can be registered with or otherwise stored by hybrid meeting system 100. As mentioned above, in-person participants 112a-e can be localized with respect to microphones 126a-d and/or video cameras 122a-d. In some examples, hybrid meeting system 100 can use the corresponding fixed locations of microphones 126a-d and/or video cameras 122a-d to subsequently localize the in-person participants 112a-e within venue 110.

As illustrated in FIG. 1, one or more computing devices can be associated with at least some of the in-person participants 112a-e. For example, in-person participants 112a-c are depicted as being associated with smartphones 102a-c, respectively. In-person participant 112c is additionally depicted as being associated with a laptop computer 104. In some cases, one or more of the computing devices associated with the in-person participants 112a-e can be personal computing devices, smartphones, etc., that are owned or used by the in-person participants. In some cases, one or more of the computing devices associated with the in-person participants 112a-e can be computing devices owned or provided by an employer of the in-person participants.

Although not shown in FIG. 1, smartphones 102a-c, laptop computer 104, and/or various other computing devices (e.g., tablets, smart watches, smart glasses, smart rings/jewelry, etc.) associated with in-person participants 112a-e can additionally include microphones, video cameras, and other sensors that can also be used to capture data corresponding to venue 110, in-person participants 112a-e, and/or primary and secondary conversations between the in-person participants. In some cases, reference made herein to microphones (such as microphones 126a-d), video cameras (such as video cameras 122a-d), and/or other sensors associated with venue 110 can be applied equally to same or similar microphones, video cameras, and/or other sensors provided on computing devices associated with the in-person participants 112*a-e*.

In some examples, hybrid meeting system 100 can automatically detect any microphones, video cameras, or sensors available on a given in-person participant's computing device(s) during a registration process. The registration process can be performed automatically as part of a hybrid meeting setup or initialization. In some examples, the registration of in-person participant computing devices can be performed automatically based on the presence of the computing device within a meeting room (such as venue 110) configured for use with hybrid meeting system 100. For example, hybrid meeting system 100 can perform an automatic device discovery process over one or more WiFi networks, Bluetooth networks or other PANs, Near Field Communication (NFC) networks, etc. In some cases, a device discovery process associated with hybrid meeting system 100 and/or venue 110 can be performed continuously, such that any computing devices within venue 110 are detected even if no meeting is scheduled. In some examples, device discovery can be performed based on a calendar of scheduled meetings, for example running for the duration of a scheduled meeting plus a pre-defined interval before and/or after the scheduled start and end times of the meeting, respectively (e.g., 15 minutes). In some examples, a registration process can be performed prior to a start time associated with a hybrid meeting. For example, a registration process can be performed for one or more prior hybrid meetings associated with the hybrid meeting system 100, and some or all of the registration information generated therein can be stored by or made accessible to hybrid meeting system 100 for future use. In some cases, a registration process can include user enrollment with hybrid meeting system 100 (e.g., performed via a user computing device, networked or online user interface to hybrid meeting system 100, etc.)

Remote participants 172*a-c* can participate in a hybrid meeting provided by hybrid meeting system 100 via network 150, which in some examples can include or otherwise provide a communicative link to a hybrid meeting conferencing service 140. As illustrated, the remote participants 172*a-c* are shown as being associated with one or more computing devices, which can be the same type as or similar to the one or more computing devices described above with respect to in-person participants 112*a-e*. For example, remote participant 172*a* is shown participating in a hybrid meeting using a laptop computer 164*a* and a smartphone 162*a*; remote participant 172*b* is shown as participating in the hybrid meeting using a smartphone 162*b*; and remote participant 172*c* is shown as participating in the hybrid meeting using a laptop computer 164*c*.

The computing devices associated with the remote participants 172*a-c* can include one or more microphones, video cameras, and/or other sensors, as described above with respect to the in-person participant computing devices. In the context of a hybrid meeting provided by hybrid meeting system 100, the remote participant computing devices can capture and transmit audio, visual, and/or sensor data of the remote participants 172*a-c* to the networked hybrid meeting conferencing service 140. The networked hybrid meeting conferencing service 140 can distribute or make available the captured data of the remote participants 172*a-c* to one or more of the in-person participants 112*a-e* and the remaining ones of the remote participants 172*a-c*. In some examples, captured data of remote participants 172*a-c* can be transmitted to playback devices located in venue 110 (e.g., televisions or video screens, speakers, computing devices of the in-person participants 112*a-e*, etc.). As will be described in greater depth below, the networked hybrid meeting conferencing service 140 can provide the remote participants 172*a-c* with captured and/or processed data corresponding to the hybrid meeting, venue 110, one or more of the in-person participants 112*a-e*, and/or one or more primary or secondary conversations between the in-person participants 112*a-e*. In some examples, the captured or processed hybrid meeting data provided to remote participants 172*a-c* by hybrid meeting conferencing service 140 can be output by screens and/or microphones associated with the remote participant computing devices.

In some examples, the networked hybrid meeting conference service 140 can provide one or more of the remote participants (e.g., remote participants 172*a-c*) with audio and/or visual data captured by a wearable device or other camera associated with one or more of the in-person participants (e.g., in-person participants 112*a-e*). In one illustrative example, the audio and/or visual data can be captured by smart glasses worn by one or more of the in-person participants 112*a-e*. In some cases, the audio and/or visual data can correspond to a hybrid meeting that is held in venue 110. In some examples, one or more of the remote participants 172*a-c* can request, view, or otherwise be provided with the audio and/or visual data captured by smart glasses worn by one or more of the in-person participants 112*a-e*. For example, the remote participants 172*a-c* can select from a listing of available audiovisual data streams captured by smart glasses worn by specific ones of the in-room participants 112*a-e*. In some cases, a remote participant can be provided with audiovisual data that matches or corresponds to the point of view (POV) of the in-room participant wearing the smart glasses, such that the remote participant can experience the hybrid meeting from the POV of an in-room participant physically located within venue 110.

In one illustrative example, the systems and techniques described herein can be used to detect multiple simultaneous conversations in a hybrid meeting (e.g., such as the hybrid meeting provided by hybrid meeting system 100). Each detected conversation can be identified as a primary conversation or a secondary conversation. Conversations identified as being secondary conversations can be further analyzed to identify the secondary conversation as private or non-private. In some examples, remote participants 172*a-c* can be automatically provided with selectable options between the identified primary conversation and any secondary conversations that were identified as non-private. In some cases, the selectable options can be used to implement selective focusing on desired ones of the primary conversation and the non-private secondary conversations, as will be described in greater depth below.

Figure 2:
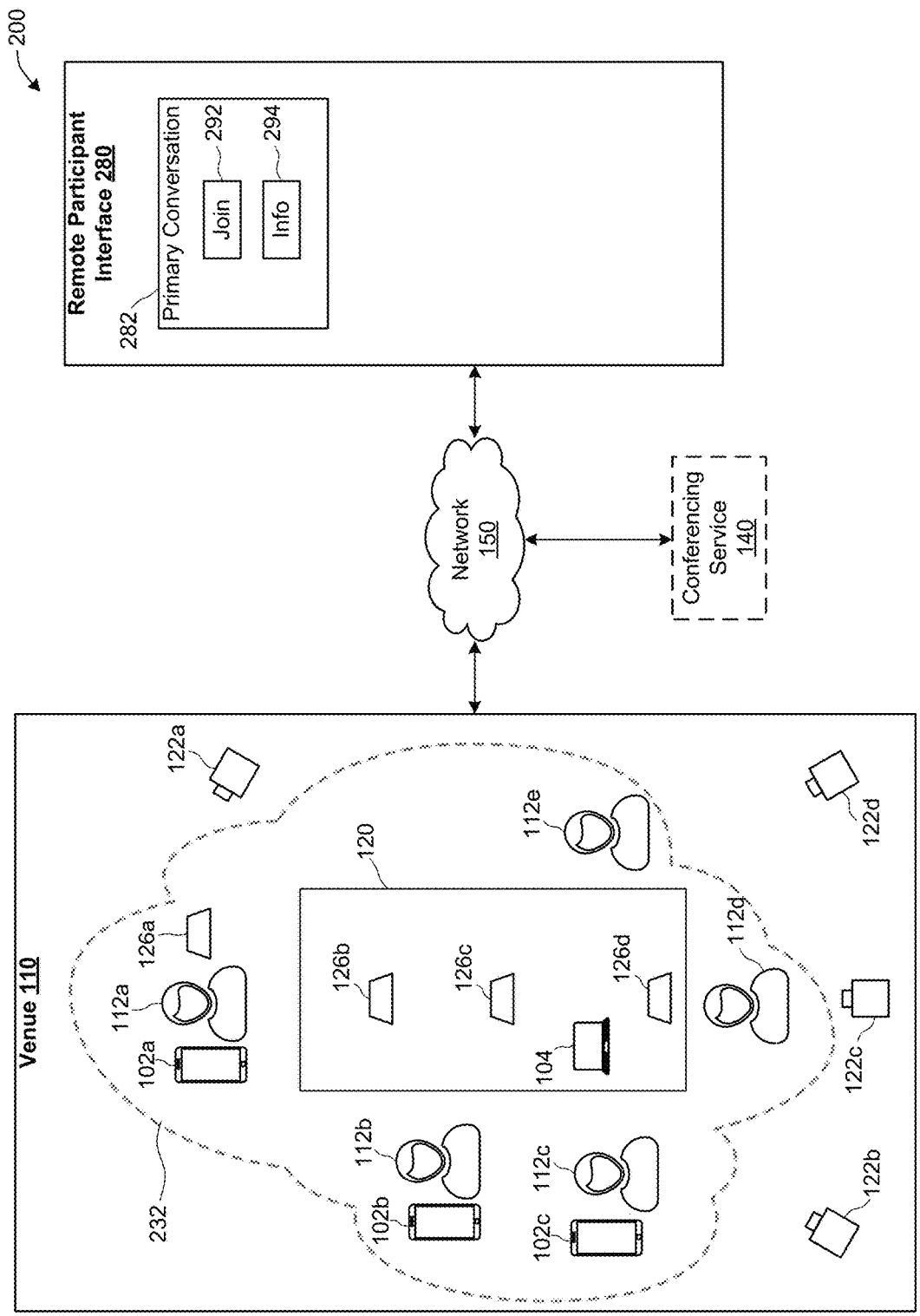
FIG. 2 is a block diagram illustrating an example of a hybrid meeting system with a remote participant interface displaying a main conversation, in accordance with some examples of the present disclosure.

FIG. 2 is a block diagram illustrating an example of a hybrid meeting system 200 with a remote participant interface 280 that includes a primary conversation option 282 corresponding to a detected primary conversation 232. As illustrated, primary conversation 232 can be detected in the context of a hybrid meeting that includes the in-person participants 112*a-e* that are physically located in venue 110 (e.g., as described above with respect to FIG. 1). Although not shown in FIG. 2, one or more remote participants such as the remote participants (e.g., 172*a-c* of FIG. 1) can attend or interact with the hybrid meeting using the remote participant interface 280. In some examples, the networked hybrid meeting conferencing service 140 can provide remote participant interface 280 to one or more of the remote participant computing devices 162a, 162b, 164a, 164c that were described with respect to the remote participants 172a-c of FIG. 1.

In some examples, primary conversation 232 can be detected based on an identification of the participant who is currently speaking in the hybrid meeting. Identification of a participant can be performed in real-time, can be based on pre-determined information, or can be based on some combination of the two. A primary conversation can include speech from a single participant such as a moderator or presenter. A primary conversation can include speech from multiple participants, such as in a group meeting where participants take turns speaking, in a presentation with a moderator who opens the floor for questions or discussion, etc.

In some cases, primary conversation 232 can be identified in response to detecting speech by a designated speaker. For example, the designated speaker associated with primary conversation 232 may be a moderator or main speaker for the hybrid meeting. Designated speakers can be determined based on time, a meeting invite, a calendar invite, integration with a teleconferencing or meeting app, etc. In some examples, speech from a designated speaker can be used to both detect the primary conversation 232 and associate a specific identity with given ones of the in-person participants 112a-e. One or more of microphones 126a-d (and/or one or more microphones included in the in-person participant computing devices 102a-c and 104) can be used to detect and identify speech, speaking individuals, and/or conversations associated with the hybrid meeting.

For example, hybrid meeting system 200 might determine that speakers A-D are scheduled to speak at 10:00, 10:15, 10:30, and 10:45, respectively (e.g., according to an agenda, a meeting invite, etc.). If in-person participant 112a is detected speaking beginning at 10:00 (or at approximately 10:00), then in-person participant 112a can be identified as person A for purposes of the hybrid meeting. In some cases, in-person participant 112a can be detected as the current or main speaker of primary conversation 232 based on a determination that in-person participant 112a is speaking the most and/or is speaking the most prominently out of all the in-person participants 112a-e. In some examples, in-person participant 112a can be identified as speaker A based at least in part on schedule information and detecting in-person participant 112a speaking the most (e.g., within the first few minutes of the period beginning at 10:00 or at approximately 10:00). In some cases, in-person participant can be identified as speaker A based at least in part on schedule information and detecting in-person participant 112a as speaking above a volume threshold (e.g., within the first few minutes of the period beginning at 10:00 or at approximately 10:00). In some examples, the volume threshold can be absolute and/or can be relative to the volume of other in-person participants. In some examples, in-person participant 112a can be identified as speaker A based at least in part on schedule information and at least a first visual gesture or cue. For example, in-person participant 112a can be identified as speaker A based on in-person participant 112a being detected as standing up or located at the front of the meeting room at or near 10:00. Subsequently, if in-person participant 112b is detected speaking beginning at or approximately at 10:15, then in-person participant 112b can be identified as person B for purposes of the hybrid meeting, etc.

In some examples, hybrid meeting system 200 can identify a new in-person participant as the current speaker in primary conversation 232 in response to a change in the detected voice. Continuing in the example above, if in-person participant 112a runs over their allotted time slot and continues talking until 10:17, hybrid meeting system 200 can maintain the earlier identification of in-person participant 112a as person A, because there has not been a change in detected voice. When in-person participant 112b later begins speaking, hybrid meeting system 200 can then identify in-person participant 112b as person B, based on detecting a voice that is different than that of in-person participant 112a/person A. In some examples, changes in the detected voice associated with primary conversation 232 can be triggered after a threshold of duration, volume, etc., is met (e.g., to avoid false positives due to temporary interruptions such as an audience member asking a question).

In one illustrative example, hybrid meeting system 200 can determine one or more updates or corrections to previously determined speaker identifications. For example, continuing in the example above, if the hybrid meeting system 200 incorrectly identifies in-person participant 112d as speaker A (e.g., because in-person participant 112d was detected speaking the most, the loudest, etc., at the 10:00 scheduled time associated with speaker A), the hybrid meeting system 200 can subsequently determine an update or correction to the identification of speaker A based on hybrid meeting system 200 receiving additional information. For example, if in-person participant 112a (e.g., the actual 'speaker A' scheduled to speak at approximately 10:00) begins speaking at 10:02, hybrid meeting system 200 can compare an amount spoken by in-person participant 112a to an amount spoken by the participant who was previously identified as speaker A (e.g., in-person participant 112d). In some cases, based at least in part on the amount spoken by the subsequent in-person participant 112a (e.g., beginning at 10:02) exceeding the amount spoken by the in-person participant 112d (e.g., beginning at 10:00 and ending at approximately 10:02), hybrid meeting system 200 can determine that speaker A should correctly be identified as in-person participant 112a rather than in-person participant 112d.

In some cases, one or more of the microphones 126a-d and/or microphones included in the in-person participant computing devices 102a-c and 104 can be designated as belonging to a main speaker of primary conversation 232. For example, audio obtained from a podium microphone 126a can be identified as belonging to speaker 112a of primary conversation 232. Similarly, one or more designated locations within venue 110 can be established where it is anticipated or known that a main speaker of primary conversation 232 will be located. A designated location can be analyzed against a calculated location of detected speech, such that detected speech coming from a designated location can be identified as belonging to a main speaker and/or belonging to primary conversation 232. In some examples, a calculated location of detected speech can be obtained based on triangulation between different microphones or sensors located in venue 110.

In some examples, one or more of the in-person participants 112a-e can be identified by prompting each (or at least some) in-person participant to state or otherwise input their name before or during the hybrid meeting. For example, in-person participants can state or otherwise input their name orally (e.g., as captured by one or more microphones associated with the hybrid meeting system 200). In some cases, in-person participants can input their name using a keyboard or other text entry device and/or text entry user interface (e.g., using a personal computing device and/or other computing device associated with the hybrid meeting system 200). For example, in-person participants can be prompted by hybrid meeting system 200 to state their name when entering venue 110, at the beginning of the hybrid meeting, when first speaking during the hybrid meeting, etc. One or more NLP systems and/or algorithms can be used to recognize a name spoken by an in-person participant, and hybrid meeting system 200 can use the recognized name to generate and tag the particular in-person participant with the appropriate identifier in any audio and/or visual data in which the particular in-person participant can be heard or seen.

In some cases, previous identifications from previous hybrid meetings or the like conducted with hybrid meeting system 200 can also be utilized to identify the in-person participants 112a-e that are attending the current hybrid meeting. The previous identifications can be obtained from previous meetings in a same meeting series as the current hybrid meeting and/or from unrelated previous meetings. In some cases, previous identifications can be obtained from an onboarding process in which a given in-person participant has set up a user profile with hybrid meeting system 200.

In one illustrative example, a main speaker associated with primary conversation 232 can be identified based on the identity of a computing device that is currently presenting at the hybrid meeting. For example, if hybrid meeting system 200 determines that smartphone 102a is being used to present slides, the hybrid meeting system 200 can further determine that the current main speaker of primary conversation 232 is likely to be in-person participant 112 (e.g., the known/registered owner or user of smartphone 102a). In some examples, automatic in-person participant identification can be based on detecting the presence of known associated devices of a particular in-person participant. For example, hybrid meeting system 200 may know or learn a correlation between a participant identity and that participant's laptop MAC address or other unique identifier, in which case the presence of the MAC address in a meeting can be used to determine that the corresponding participant is present. Manual identification, including self-identification and log-in requirements, can also be utilized.

In some examples, each in-room participant's phone, laptop, or other computing device may share a voice print of the in-room participant (along with a corresponding participant identity) with the hybrid meeting system 200, such that detected speech can be analyzed and matched to a voice print and participant identity pair. In some cases, an in-room participant's device may collect or learn voice prints of other in-room participants that have been identified in a previous meeting. Collected voice prints from previous meetings can be shared with one or more of hybrid meeting system 200 and/or the participant computing devices present for the current hybrid meeting.

For example, in a previous meeting, participant A's device may share a voice print for participant A and identify the voice print as belonging to person A, and participant B's device may likewise share a voice print for participant B and identify the voice print as belonging to participant B. In a future hybrid meeting, participant A's device may share the voice print for participant A and identify it as belonging to participant A, and may also share the stored/collected voice print for participant B and identify the print as belonging to participant B. In some cases, an in-person participant's computing device may share other information previously used for participant identification. For example, if in a previous meeting participant B's device with ID XYZ123 was identified as belonging to participant B, then participant A's device may share that information to identify participant B at a subsequent meeting when device ID XYZ123 is present. In some examples, hybrid meeting system 200 may itself collect or learn voice prints and corresponding identities of in-person participants from previous meetings and then use then collected voice print-identity pairs to automatically identify in-person participants in subsequent meetings. For example, in a previous meeting, participant A's device may share a voice print for participant A and identify the voice print as belonging to participant A; participant B's device likewise shares a voice print for participant B identifying it as belonging to participant B. In some examples, these voice prints and their corresponding identifications may be stored in a database or the like such that, in a future meeting, speech determined to match participant B's stored voice print may automatically be identified as belonging to participant B.

In one illustrative example, after identifying one or more of the in-room participants 112a-e, hybrid meeting system 200 can automatically tag the identified in-room participants with their names or other identifiers in the audio and/or visual data of the hybrid meeting that is provided to remote participants. In some examples, the automatic in-person participant identification can be provided in combination with identifying and distinguishing primary conversations and secondary conversations, although it is also possible for the automatic participant identification to be provided in standalone fashion.

In some examples, hybrid meeting system 200 can use one or more visual cues to identify or distinguish between primary conversation 232 and one or more secondary conversations, as will be discussed below. Visual cues of a primary conversation can include (but are not limited to) an in-person participant standing, an in-person participant facing towards the remaining in-person participants, an in-person participant being looked at by the remaining in-person participants, an in-person participant positioned at the front of venue 110 or in some other relevant area such as a whiteboard, etc.

In some examples, one or more characteristics of speech audio that is recorded or detected by microphones in venue 110 can be used to identify the primary conversation 232. The microphones can include the microphone 126a-d and/or one or more microphones provided by the in-person participant computing devices 102a-c and 104. Characteristics of speech audio used to identify primary conversation 232 can include the prominence of detected speech (e.g., in terms of volume, number/quantity of words/speech, duration, etc.). In some examples, one or more characteristics of speech audio can be compared to one or more volume thresholds (e.g., speech above a threshold is identified as a primary conversation, speech below a threshold is identified as a secondary conversation).

In some examples, one or more real-time NLP (Natural Language Processing) systems or algorithms can be used to identify speech in which an individual identifies themself as the main speaker of primary conversation 232. In one illustrative example, keyword detection can be used to identify the main speaker(s) and/or the primary conversation 232. For example, if in-person participant 112a has been identified as the current main speaker of primary conversation 232 and says, "Does anyone have any questions?" the next in-person participant that speaks over a certain volume threshold can temporarily become the main speaker of primary conversation 232 as they ask their question (e.g., in-person participant 112b can be identified as a temporary main speaker while asking a question to in-person participant 112a). Based at least in part on the identification of in-person participant 112b as a temporary main speaker, speech audio from in-person participant 112b can be included in the primary conversation 232 rather than a secondary conversation. If or when in-person participant 112a responds to the question from in-person participant 112b, in-person participant 112a can revert to being identified as the current main speaker of primary conversation 232. If a different participant (e.g., in-person participant 112c) responds to the question instead, in-person participant 112c can become the new temporary main speaker of primary conversation 232. In some cases, as the original main speaker of primary conversation 232, in-person participant 112a may always be considered part of the primary conversation 232 even as others are speaking.

In some examples, hybrid meeting system 200 can utilize NLP and/or keyword detection to determine names or identities of specific individuals who are speaking in the hybrid meeting, whether in primary conversation 232, in a secondary conversation, and/or in a combination of primary and secondary conversations. For example, if the current main speaker says "Bill, do you have a question?" hybrid meeting system 200 may determine that the next person to speak can be identified as "Bill" (and, in this example, that his speech should be identified as belonging to the primary conversation 232). In some aspects, hybrid meeting system 200 can further determine (or confirm) name information and/or identity information of one or more meeting participants by analyzing meeting participant names (e.g., based on meeting invites, accepted meeting invites, etc.) against spoken names detected using NLP or keyword detection, as described above. For example, in response to detecting the current main speaker saying "Bill, do you have a question?" hybrid meeting system 200 can analyze a list of meeting participant names for same or similar names (e.g., 'Bill,' 'William,' etc.). In some examples, ambiguous results can be displayed. For example, if hybrid meeting system 200 determines that a "Bill Smith" and a "Bill Jones" are both attending the hybrid meeting, then the hybrid meeting system 200 can identify the next person to speak as "Bill Smith or Bill Jones." In some examples, hybrid meeting system 200 can display an ambiguous result or name identification until additional information is received such that the hybrid meeting system 200 can resolve the ambiguity and identify "Bill Smith" and/or "Bill Jones" individually.

In some aspects, the primary conversation option 282 can be selectable by one or more of the remote participants. For example, as shown in FIG. 2, the primary conversation option 282 may include a 'Join' option 292 that allows a remote participant to join primary conversation 232 and an 'Info' option 294 that allows the remote participant to view information (e.g., speaker identity/identities, attendee information, meeting summary, etc.) associated with primary conversation 232. In some cases, the 'Join' option 392 can cause hybrid meeting system 200 and/or hybrid meeting conferencing service 140 to transmit audio and/or visual data of the primary conversation 232 to a remote participant. For example, the 'Join' option 392 can cause hybrid meeting system 200 and/or hybrid meeting conferencing service 140 to transmit to a remote participant audio and/or visual data that was captured by smart glasses or other wearable computing devices associated with one or more of the in-person participants 112a-e. In some cases, audio and/or visual data captured by smart glasses or other wearable computing devices can be transmitted to a remote participant in addition to audio and/or visual data captured by the one or more cameras 122a-d and/or the one or more microphones 126a-d associated with venue 110. The 'Join' option 292 can additionally cause hybrid meeting system 200 and/or hybrid meeting conferencing service 140 to receive audio and/or visual data from the remote participant for inclusion in the primary conversation 232.

Figure 3:
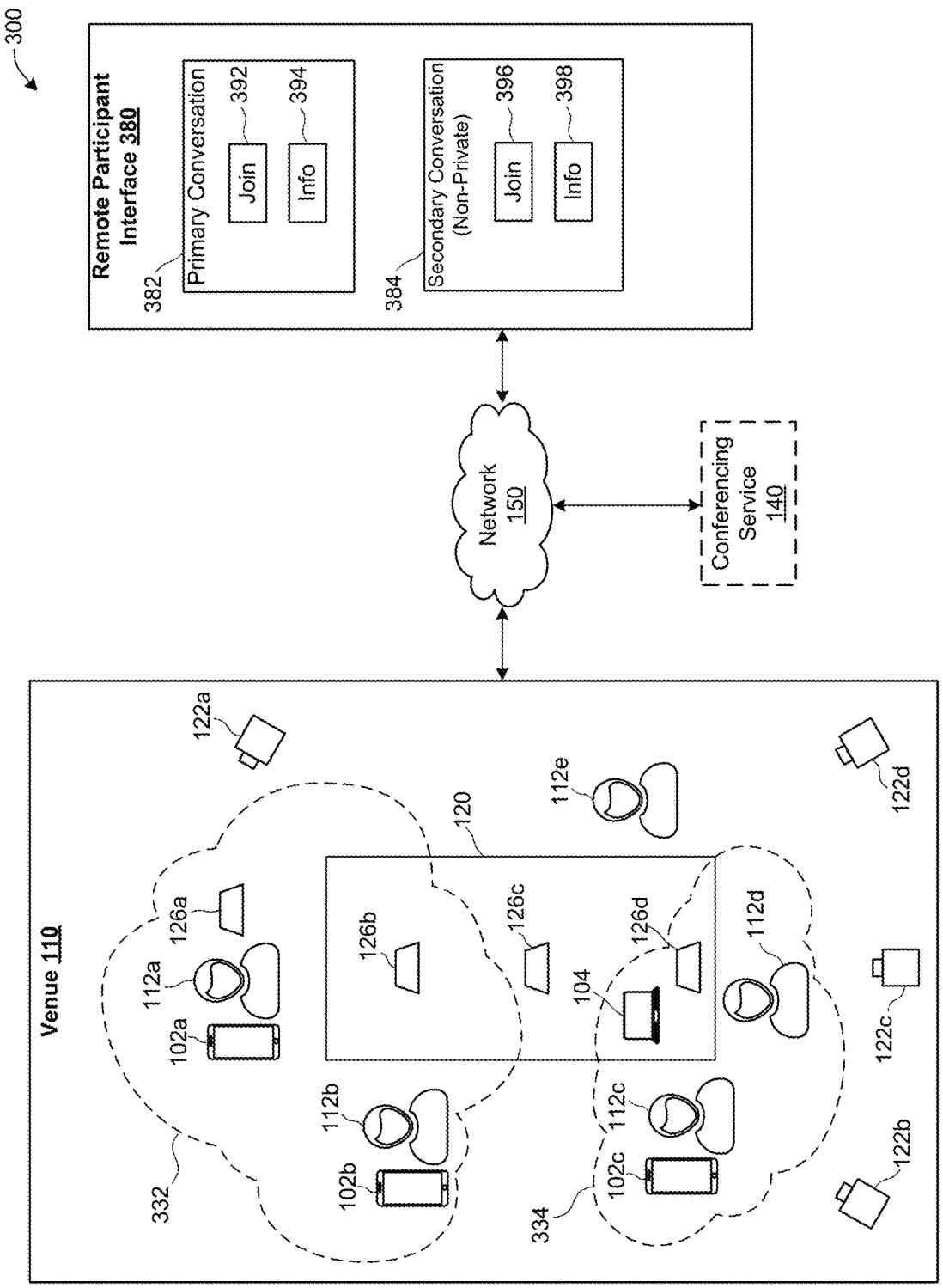
FIG. 3 is a block diagram illustrating an example of a hybrid meeting system with a remote participant interface displaying a main conversation and a non-private side conversation, in accordance with some examples of the present disclosure.

In some examples, one or more gestures and/or cues can be used to determine or infer the existence of one or more secondary conversations between in-person participants 112a-e in the hybrid meeting. For example, FIG. 3 illustrates a hybrid meeting system 300 in which a primary conversation 332 has been detected between in-person participants 112a and 112b and a secondary conversation 334 has been detected between in-person participants 112c and 112d. In some aspects, the detected secondary conversation 334 may be occurring in approximately real-time and/or simultaneous with the primary conversation 332. In some examples, hybrid meeting system 300 can include one or more past or completed secondary conversations that are displayed for selection (e.g., as secondary conversation 334). Note that in this example, in-person participant 112e is not depicted as being included in either primary conversation 332 or secondary conversation 334—in some cases, this can occur when in-person participant 112e is listening passively but not contributing to either conversation and/or when hybrid meeting system 200 has not yet been able to determine which of the two conversations 332,334 in-person participant 112e is focusing on.

In one illustrative example, hybrid meeting system 300, such as via one or more of the video cameras 122a-d and/or sensors provided in venue 110, can be used to detect gestures or cues indicative of secondary conversation 334. In some cases, hybrid meeting system 300 can additionally, or alternatively, utilize one or more cameras and/or sensors provided on the in-person participant computing devices 102a-c and 104 to detect gestures or cues indicative of secondary conversation 334. For example, hybrid meeting system 300 can detect a change in a distance between two in-person participants, who may lean in towards each other in order to engage in a secondary conversation. In the context of the example of FIG. 3, hybrid meeting system 300 can identify secondary conversation 334 based on detecting a change in distance between in-person participant 112c and in-person participant 112d. While FIG. 3 illustrates an example in which a secondary conversation 334 occurs between in-person participants seated at neighboring locations around table 120, it is noted that a secondary conversation can also be detected when occurring between non-adjacent in-person participants and/or including one or more remote participants.

In some examples, the detected gestures or cues used to identify secondary conversations such as secondary conversation 334 can include lip movements of in-room participants, particularly of participants that were not already identified as being the main speaker or have not been identified as currently involved in the primary conversation 332. Similarly, the detected gestures and/or cues for identifying secondary conversations can include a change in head or body orientation of one or more in-person participants. For example, secondary conversation 334 can be identified based on the detection of in-person participant 112c and/or in-person participant 112d turning to face each other instead of facing towards the front of venue 110 (e.g., turning away from primary conversation 332 and main speaker 112a). In some examples, hybrid meeting system 300 can identify secondary conversations based on an in-person participant covering their mouth with a hand, lowering their head, etc.

Secondary conversations can also be detected based on gestures and cues related to the position or location of in-person participants 112a-e within the physical space of venue 110 and/or with respect to conference table 120. For example, secondary conversations can be detected based on the formation of distinct clusters of in-person participants, such as might occur when a hybrid meeting involves a break-out session with groups of three participants discussing different topics. In some examples, secondary conversations can be identified using posture detection and analysis of the in-person participants 112a-e.

In some examples, secondary conversations can be detected based on gestures and/or cues that are non-visual in nature. For example, one or more gestures or cues can be detected from audio data captured by microphones 126a-d, sensor data captured by sensors associated with venue 110, and/or microphone and sensor data obtained from the in-person participant computing devices 102a-c and 104. In some cases, secondary conversation 334 can be identified by detecting audio data of voices that do not match the voice of the main speaker or other designated/expected speakers. For example, in the context of FIG. 3, secondary conversation 334 can be identified by detecting audio data of the voices of in-person participants 112c and/or 112d and determining that these voices do not match the voice of main speaker 112a or the other participant 112b in primary conversation 332.

Secondary conversation 334 can also be identified on the basis of detecting speech originating from a location distinct from that of main speaker 112a and/or primary conversation 332; detecting speech with a different volume, such as whispers or lowered voice volumes below some threshold; detecting speech in a different language from that of the main speaker 112a; detecting speech in a different cadence from that of the main speaker 112a; detecting Polsinelli Ref. No. 094922-712255 speech relating to subject matter or keywords that differ from that of the primary conversation 332; etc. In some cases, one or more biometric sensors can also be utilized, as well as biometric determinations and/or calculations based on existing sensor and camera data. For example, the detected heart rate and/or breathing rate can be different for in-person participant 112a, who is the main speaker in primary conversation 332, than it is for in-person participants 112c and 112d involved in the secondary conversation 334. In some examples, any of the features used to identify a conversation as a primary conversation can be used for identifying another conversation as a secondary conversation, and vice versa.

After identifying primary conversation 332 and any secondary conversations, such as secondary conversation 334, hybrid meeting system 300 can present remote participants of the hybrid meeting with one or more options to selectively focus on and/or view information corresponding to a one or more of the currently ongoing conversations. Selective focus can include ignoring, muting, filtering, or otherwise deemphasizing any non-selected conversations in order to present the focused conversation(s) to a remote participant as desired. As illustrated in FIG. 3, hybrid meeting system 300 can include a remote participant interface 380 with a selectable primary conversation option 382 (corresponding to the detected primary conversation 332) and a selectable side conversation option 384 (corresponding to the detected secondary conversation 334).

The selectable primary conversation option 382 can include a 'Join' option 392 that allows a remote participant to join primary conversation 332 and an 'Info' option 394 that allows the remote participant to view information (e.g., speaker identity/identities, attendee information, meeting summary, etc.) associated with primary conversation 332. For example, 'Join' option 392 can cause hybrid meeting system 300 and/or hybrid meeting conferencing service 140 to transmit audio and/or visual data of the primary conversation 332 to a remote participant. For example, the 'Join' option 392 can cause hybrid meeting system 200 and/or hybrid meeting conferencing service 140 to transmit to a remote participant audio and/or visual data that was captured by smart glasses or other wearable computing devices associated with one or more of the in-person participants 112a-e. In some cases, audio and/or visual data captured by smart glasses or other wearable computing devices can be transmitted to a remote participant in addition to audio and/or visual data captured by the one or more cameras 122a-d and/or the one or more microphones 126a-d associated with venue 110. The 'Join' option 392 can additionally cause hybrid meeting system 300 and/or hybrid meeting conferencing service 140 to receive audio and/or visual data from the remote participant for inclusion in the primary conversation 332.

The 'Info' option 394 can provide the remote user with information associated with primary conversation 332. For example, information associated with primary conversation 332 can include, but is not limited to, a list of participants/identified individuals in the primary conversation 332, a real-time transcript or summary of the past content of primary conversation 332, options to send a private message to one or more participants in primary conversation 332, options to initiate or request a secondary conversation with one or more participants in primary conversation 332, etc.

In one illustrative example, the systems and techniques described herein can include one or more translation options and/or one or more transcription options. In some cases, the translation and/or transcription can be performed in real-time (e.g., as a primary or secondary conversation occurs). In some examples, information associated with a set of participants or identified individuals in a hybrid meeting can be used to improve a translation and/or transcription performed by the hybrid meeting system 300. For example, the list of participants or identified individuals that may be presented in response to selection of the 'Info' option 394 (e.g., described above) can be the same as or similar to the participant identity information that can be used to improve translation and transcription for a hybrid meeting.

In some examples, participant identity information can be used to obtain one or more user preferences, which can include translation and/or transcription preferences. The participant identity information can be associated with in-person participants, remote participants, or a combination of the two, as has been described previously. In some examples, the participant identity information can be used to obtain user preferences that indicate a preferred or requested language to be associated with the translation and/or transcription options provided by the hybrid meeting system (e.g., hybrid meeting system 300). In some cases, the preferred or requested language for translation/transcription can be different than the language(s) that are being used or will be used in the hybrid meeting.

In some examples, identified participants (e.g., in-person participants, remote participants, or a combination) can be associated with previously determined user profiles that may include one or more voice models, voice profiles, and/or voice prints that are associated with a given participant. In some cases, stored or previously determined voice information can be used to enhance translation and/or transcription of the speech of a particular meeting participant (e.g., using the stored voice information to more accurately determine the words spoken by the meeting participant associated with the stored voice information).

In some cases, by identifying the primary and secondary conversations (e.g., primary conversation 332, secondary conversation 334), hybrid meeting system 300 can more accurately perform translation and/or transcription of the spoken content of some or all of the identified conversations. For example, by identifying primary conversation 332 and secondary conversation 334, and the associated meeting participant(s) in each, hybrid meeting system 300 can prevent spoken content from a first conversation being incorrectly assigned (e.g., after transcription or translation) to the automatically generated textual record of a second conversation. In some cases, hybrid meeting system 300 can identify primary and secondary conversations (e.g., primary conversation 332 and secondary conversation 334) to filter out words and/or spoken content from other conversations that are not the subject of a given transcription or translation.

In some examples, based at least in part on identifying the primary and/or secondary conversations that are occurring, hybrid meeting system 300 can perform simultaneous or parallel transcription and/or translation of some, or all, of a plurality of concurrent conversations. In some aspects, an automatically generated real-time transcription or translation of a given conversation can be presented in response to selection of an associated user interface option (e.g., 'Info' option 394, 'Info' option 398, etc.) In some cases, hybrid meeting system 300 and/or remote participant interface 380 can include a dedicated translation or transcription listing, from which a user (e.g., in-person or remote meeting participant) can select a translation or transcription from a listing of associated conversations. The listing of associated conversations for which translations or transcriptions are provided by hybrid meeting system 300 can include ongoing conversations, completed (e.g., earlier) conversations, etc. In some examples, a separate thread can be utilized for the transcription and/or translation of each identified conversation, with each identified conversation belonging to at least one thread.

In one illustrative example, hybrid meeting system 300 can include one or more translations and/or transcriptions for some, or all, of the conversations that have been identified in association with a past or ongoing hybrid meeting. For example, hybrid meeting system 300 can present a selectable list or user interface that allows a particular conversation (e.g., primary conversation 332, secondary conversation 334, etc.) to be selected. In some cases, selection of a conversation can automatically trigger the presentation of a transcript or translation generated for the selected conversation. For ongoing conversations (e.g., conversations that are being transcribed or translated in real-time), hybrid meeting system 300 can automatically present the most recently generated portion of the translation or transcript. In some cases, hybrid meeting system 300 can initially present a translation or transcript associated with an ongoing conversation, beginning at the start of the translation or transcript.

In some examples, hybrid meeting system 300 can include a listing or user interface that includes a plurality of selectable options for one or more identified conversations associated with a hybrid meeting. For example, a selected conversation may be associated with at least one transcript (e.g., in the original or native language of the selected conversation) and one or more translations of the selected conversation into different languages. In some examples, a translation can be generated based on translating the transcript of a selected conversation. In some cases, a translation can be generated directly from the audio data or speech content of the conversation (e.g., without the intermediate step of first transcribing the conversation before translating it). In some aspects, a selected conversation can be associated with a plurality of different translations, which can be presented in a selectable list or interface. In some examples, the hybrid meeting system 300 can automatically generate translations into one or more pre-determined languages. In some cases, the hybrid meeting system 300 may generate translations based on individual requests and/or individual user preferences associated with the meeting participants.

In some examples, hybrid meeting system 300 can present a translation or transcription that is synchronized with media or other presentation materials that were being presented when the associated conversation(s) took place. For example, hybrid meeting system 300 can match or correlate a timestamp associated with a translation/transcription with a timestamp associated with the media or presentation materials from the hybrid meeting. In some cases, hybrid meeting system 300 can match or correlate a timestamp associated with a translation/transcription with a timestamp associated with a video recording of the hybrid meeting. In another example, hybrid meeting system 300 can match or correlate a timestamp associated with the translation/transcription with one or more timestamps associated with one or more sensor data outputs that were stored or recorded by hybrid meeting system 300. For example, hybrid meeting system 300 can synchronize a translation or transcription of a conversation with certain slides that were presented during the conversation.

In some examples, hybrid meeting system 300 can match or correlate timestamps associated with the translation/transcription of a conversation with dynamic content that was generated or presented by a participant during the conversation (e.g., content drawn on a whiteboard). In some cases, hybrid meeting system 300 can synchronize the conversation translation/transcription with a video feed or video data of the whiteboard. In some examples, the video feed or video data can be analyzed and automatically transcribed (e.g., its textual content extracted and added to the transcript) or translated (e.g., extracted textual content can be translated from its native or original language to a desired language specified by a meeting participant's user profile).

In some aspects, the systems and techniques can summarize one or more conversations (e.g., a primary conversation and/or one or more secondary conversations) based on text or audio of the conversation(s). For instance, the systems and techniques can generate a summary (e.g., a description, simplification, a group of keywords, etc.) that summarizes each conversation of the one or more conversations. In one illustrative example, a summary for one or more conversations can be a distilled version of the conversation(s) into a number of words or sentences (e.g., one, two, three, etc. words or sentences) that can help one or more users (e.g., remote user(s)) to understand at a high level the subject matter of the conversation(s).

In some cases, the systems and techniques can perform keyword detection on text and/or audio of a conversation when generating a summary of the conversation. For instance, if the phrase "holiday party" (and in some cases any related terms/phrases or synonyms, such as "Christmas party") are recited above a threshold (e.g., an absolute number of times, a percentage/relative number of times relative to the number of words in the conversation, etc.), the systems and techniques can use the phrase "holiday party" as a keyword describing the conversation in the summary.

As noted above, in some cases, multiple keywords may be presented in a summary of one or more conversations. In such cases, the various keywords can be presented in any suitable manner. For example, keywords can be displayed with an indication of a number of times a particular word is used (e.g., Holiday Party: 7, Merger and Acquisition Deal: 5 times, vacation: 4 times, etc.). In another example, keywords can be displayed with increasing size based on the amount of usage.

In some aspects, the transcriptions, the summaries, and/or the keywords may be searchable, such as by remote users. For instance, a remote user may utilize the system (e.g., Polsinelli Ref. No. 094922-712255 by interacting with a graphical user interface) to search for any secondary or side conversations involving the phrase "Merger and Acquisition Deal" or "M&A deal." In some cases, a user (e.g., a remote user) may utilize the system (e.g., by interacting with the graphical user interface) to flag one or more terms or phrases so that when the flagged term or phrase are recited or otherwise made available (e.g., in a transcription of the one or more conversations), the system will output a notification (e.g., as an audio output, a haptic output, a displayed notification, by highlighting the term/phrase, etc.) indicating to the user that the term/phrase has been recited. In such cases, the user can decide to listen in or replay/review the conversation upon receiving the notification. In one illustrative example, early in a meeting, the user may provide input to the graphical user interface to flag the phrase "M&A deal" so that any conversations within the meeting involving the phrase will be highlighted or otherwise output as a notification for the user's attention. In some cases, the user may provide input to the graphical user interface that causes the system to mute or filter out the flagged terms in the main conversation (e.g., because the terms/phrases may result in too many hits or it is presumed the user heard that as normal).

In some cases, specific information may be provided by remote participant interface 380 for each available or selectable conversation (e.g., such as the selectable primary conversation option 382 and the selectable secondary conversation option 384). For example, remote participant interface 380 could display selectable conversation options with descriptive names or labels such as, "Primary Conversation by Tom Patterson (main speaker)," "Secondary Conversation 1 between Jane Smith and Bob Jones," "Secondary Conversation 2 between Jane Williams and Susan Wallace," etc.

In some examples, as described above, remote participants can use the remote participant interface 380 to select between the displayed conversation options for the selectable primary conversation option 382 and the selectable secondary conversation option 384. In some cases, a selected conversation can be automatically determined and provided to the remote participant (e.g., based on visual or other cues in the venue 110 or between the in-person participants 112a-e, user preferences, words/phrases detected, etc.). Remote participants may also choose to prioritize certain speakers (e.g., a main speaker, specific in-person participants or remote participants) so that when a prioritized speaker is speaking in a detected primary or secondary conversation, the prioritized speaker's conversation takes precedence and is automatically focused on and presented to the remote participant via remote participant interface 380, while non-prioritized speech or conversations are ignored, filtered, or deemphasized As illustrated in FIG. 3, the selectable secondary conversation option 384 can include a 'Join' option 396 that allows the remote participant to join secondary conversation 334 and an 'Info' option 398 that allows the remote participant to view information associated with secondary conversation 334. In some examples, the secondary conversation 'Join' option 396 can be the same as or similar to the primary conversation 'Join' option 392 described above. In some examples, the secondary conversation 'Info' option 398 can be the same as or similar to the primary conversation 'Info' option 394 described above. For example, the secondary conversation 'Join' option 396 can provide remote participants with an option to obtain audiovisual data of the secondary conversation and/or with an option for the remote participant(s) to join or participate in the selected secondary conversation. In some cases, the audiovisual data of the secondary conversation can correspond to the point of view (POV) of at least one of the in-person participants in a secondary conversation that is selected by the remote participant. For example, a remote participant can use the 'Join' option 396 to obtain an audio feed and or a video feed of a secondary conversation as captured by smart glasses worn by one of the in-person participants involved in the selected secondary conversation. In some examples, audio and/or visual data obtained from smart glasses worn by an in-person participant may be made private in response to detecting that the in-person participant wearing the smart glasses is involved in or participating in a private secondary conversation, as will be described in greater depth below.

In some examples, hybrid meeting system 300 can perform one or more additional actions in response to receiving a selective focus selection for primary conversation 332 over secondary conversation 334 or vice versa (e.g., in response to receiving a selection from a remote user of the selectable primary conversation option 382 or the selectable secondary conversation option 384). For example, when a remote participant uses remote participant interface 380 to select the 'Join' option 396 associated with the selectable secondary conversation option 384, hybrid meeting system 300 can interpret the selection as a request from the remote participant to focus on secondary conversation 334 and ignore or deemphasize primary conversation 332. In one illustrative example, one or more directional microphones in the venue 110 can be controlled to obtain (or better obtain) audio data of the requested secondary conversation 334. In some cases, the directional microphones can be included in the microphones 126a-d. In some examples, the directional microphones can be provided in addition to the microphones 126a-d.

In response to a remote participant selecting the 'Join' option 396 associated with the selectable secondary conversation option 384, hybrid meeting system 300 can select and/or adjust microphones that are near the location of secondary conversation 334 in order to provide the remote participant with optimized audio of secondary conversation 334. In one illustrative example, hybrid meeting system 300 can select one or more microphones determined to be closer to the selected secondary conversation 334 and/or can change the strength/sensitivity of microphones as needed. For example, hybrid meeting system can provide a remote participant with audio of secondary conversation 334 that is obtained using microphone 126d, which is the closest of the four microphones 126a-d to secondary conversation 334.

In some examples, hybrid meeting system 300 can dynamically mute and unmute one or more of the microphones 126a-d and/or microphones included in the computing devices of the in-person participants 112a-e. In some cases, computing devices and/or microphones associated with in-person participants that are not participating in secondary conversation 334 can be used to obtain audio of the secondary conversation 334. In some examples, hybrid meeting system 300 can select between different microphones for obtaining audio data of secondary conversation 334 in response to dynamic changes detected in venue 110. For example, if speech in secondary conversation 334 is weak or muffled in audio data obtained from microphone 126d, then hybrid meeting system 300 can automatically switch to a microphone included on laptop 104 or smartphone 102c. In some cases, hybrid meeting system 300 can adjust a sensitivity of microphone 126d or apply a filter or other post-processing techniques to the audio data obtained from microphone 126d.

In some examples, hybrid meeting system can provide the remote participant with options to select between different microphones or audio sources to obtain audio data of secondary conversation 334 (e.g., options to select between audio data from microphone 126d, audio data from a microphone of laptop computer 104, and audio data from a microphone of smartphone 102c). The available audio sources for secondary conversation 334 can be automatically determined based on registration information of the microphones and computing devices present in venue 110. In some cases, the available audio sources can be determined based on localization information of secondary conversation 334 and/or the corresponding in-person participants 112c and 112d, analyzed against registration information or localization information of the available audio sources. In one illustrative example, hybrid meeting system 300 can automatically analyze each available audio source for a primary or secondary conversation selected in remote participant interface 380 by a remote participant and select the audio source determined to provide the highest quality audio representation of the selected conversation. For example, hybrid meeting system 300 can analyze each available or potential audio source for the secondary conversation 334 and select the audio source having the loudest volume and/or can select the audio source with the greatest clarity (e.g., least distortion, background noise, etc.)

In some examples, hybrid meeting system 300 can select or adjust one or more video cameras used to provide visual (or audiovisual) data of the secondary conversation 334 to a remote participant. As mentioned previously, the one or more video cameras can include the video cameras 122a-d and/or video cameras provided on the in-person participant computing devices 102a-c and 104. In some cases, hybrid meeting system 300 can select or adjust the one or more video cameras to capture a field of view that includes all of the in-person participants associated with the conversation selected by a remote participant. In the context of the example of FIG. 3, the hybrid meeting system 300 can select or adjust the one or more video cameras to capture a field of view that includes in-person participant 112c and in-person participant 112d. In one illustrative example, when a remote participant chooses to selectively focus on primary conversation 332, the hybrid meeting system can select between or adjust multiple video cameras as the current speaker of the primary conversation 332 changes. For example, video camera 122c can be used to provide a remote participant with video data when in-person participant 112a is speaking in primary conversation 332, and video camera 122d can be used if in-person participant 112b asks a question or otherwise begins speaking in primary conversation 332. In some cases, a camera on a laptop facing in-person participant 112b (not shown) can be used to provide the remote participant with an optimal video data of in-person participant 112b while speaking in primary conversation 332.

In some examples, gestures or keyword processing may be used to identify references made in either primary conversation 332 or secondary conversation 334 to certain objects, such as a whiteboard, or other locations within the physical space of venue 110. Based on the identified reference(s), hybrid meeting system 300 can then automatically provide selective focus to the referenced object or location. For example, an in-room participant getting up to write on a white board may cause one of the video cameras 122a-d to shift its viewing angle or field of view and/or a different one of the video cameras 122a-d may be selected to better view the whiteboard. In some examples, if a certain number or percentage of the in-room participants 112a-e (or a certain number or percentage of the in-room participants associated with a particular conversation) shift to face a new location or object, hybrid meeting system 300 can automatically control one or more of the video cameras 122a-d to focus on the new location or object.

As mentioned previously, in some examples the systems and techniques described herein can be used to detect primary and secondary conversations that occur between in-person participants in a hybrid meeting, such as the in-person participants 112a-e. In some examples, the systems and techniques described herein can further be used to identify a detected secondary conversation as private or non-private. In some examples, the systems and techniques described herein can be used to identify a secondary conversation as transitioning (or as having transitioned) from a private status to a non-private status, and vice versa. Secondary conversations identified as being non-private can be shared with or made available to remote participants of a hybrid meeting, for example as described above with respect to the secondary conversation 334 of FIG. 3. In some examples, the secondary conversation 334 of FIG. 3 can be associated with the selectable secondary conversation option 384 and made available to remote participants via remote participant interface 380, based at least in part on hybrid meeting system 300 identifying secondary conversation 334 as non-private.

Figure 4:
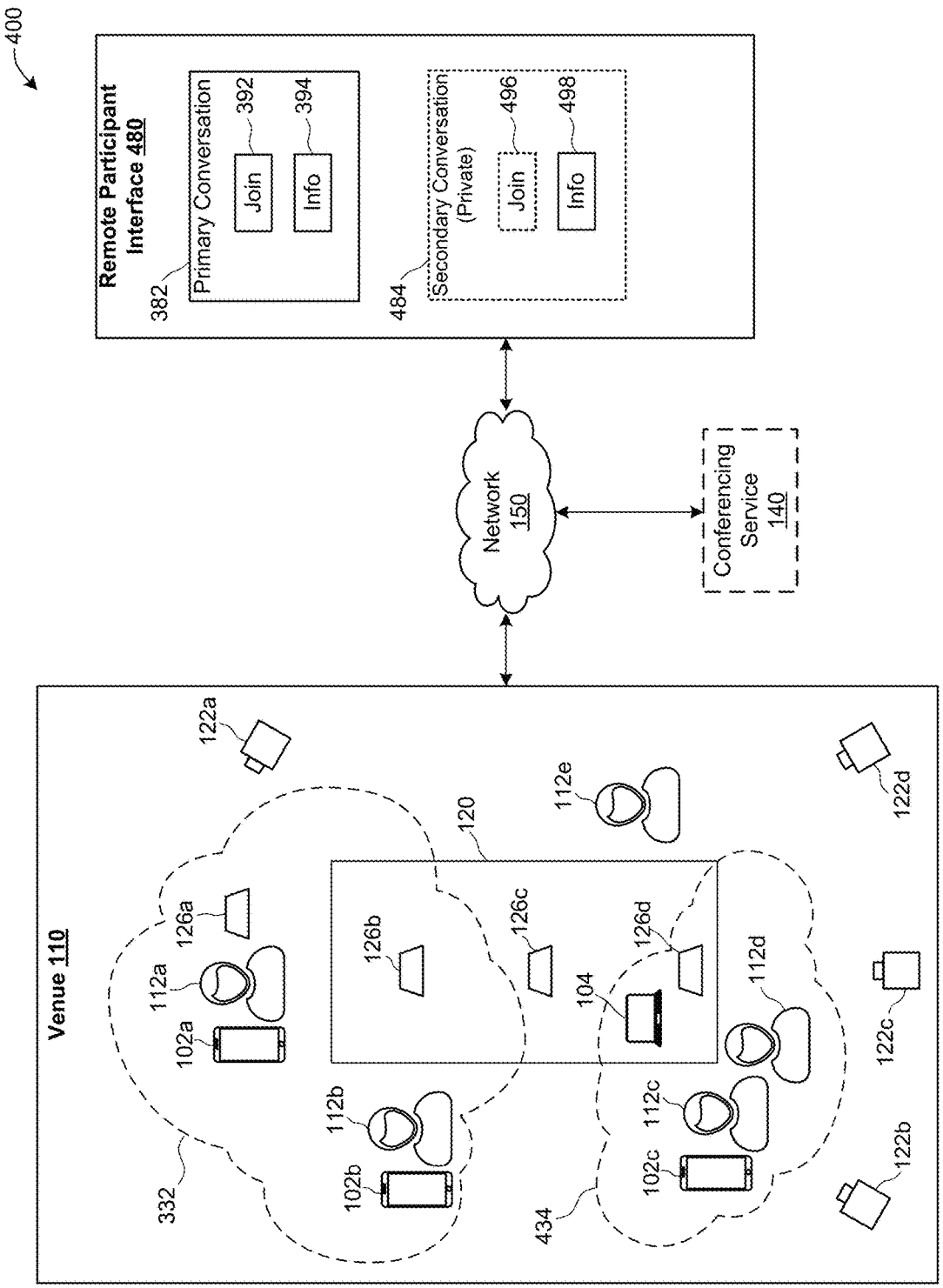
FIG. 4 is a block diagram illustrating an example of a hybrid meeting system with a remote participant interface displaying a main conversation and a private side conversation, in accordance with some examples of the present disclosure.

FIG. 4 illustrates an example hybrid meeting system 400, which in some examples can be the same as the example hybrid meeting system 300 of FIG. 3 after the secondary conversation 334 (previously identified as being non-private) has transitioned to being identified as a private secondary conversation 434. In some examples, a secondary conversation can be identified as private and/or as having transitioned from a private status to a non-private status and vice versa, based on one or more detected gestures and/or cues that are performed by or otherwise associated with at least one in-person participant in the secondary conversation. The detected gestures and/or cues can be detected by the presently disclosed hybrid meeting system 400 based on one or more of audio data, camera data, sensor data, or any combination thereof. In some examples, the detected gestures and/or cues can include a body position or a body orientation of a participant in the secondary conversation. For example, if a secondary conversation participant turns his face or body to be oriented in a direction facing away from the primary conversation, or covers his mouth with his hand, then the secondary conversation can be identified as private.

In some examples, one or more pre-determined gestures or cues (e.g., performed by one or more of the in-person participants 112a-e) can be used to identify secondary conversations as having a private status and/or as transitioning from a non-private to a private status. For example, pre-determined gestures can include, but are not limited to, a secondary conversation participant (e.g., an in-person participant and/or a remote participant) holding up his hand or palm to a camera, using his hand to cover his mouth, etc. In some cases, the pre-determined gestures can be used as indicators to hybrid meeting system 400 that at least one participant in a secondary conversation wants privacy going forward. In some examples, pre-determined verbal cues or spoken phrases and/or commands can be used by secondary conversation participants to indicate that they desire privacy going forward for the secondary conversation. For instance, a secondary conversation participant can speak a phrase such as "This is private," "Private mode," "Privacy please," etc., wherein the spoken phrase is a pre-determined phrase indicative of a desired private status for the secondary conversation. In some examples, the hybrid meeting system 400 can include one or more user interface elements that allow secondary conversation participants to request or set their secondary conversation(s) to a private status or private determination. For example, the user interface element may include, but is not limited to, a mute button, a 'Private' button, etc.

In some cases, the hybrid meeting system 400 can include one or more automatic privacy triggers, wherein the presence or detection of an automatic privacy trigger causes the hybrid meeting system 400 to automatically identify a secondary conversation as private (e.g., even if other gestures and/or cues have not yet indicated that the secondary conversation should be treated as private). For example, automatic privacy triggers can include a meeting participant (e.g., in-person or remote) answering his or her phone during the hybrid meeting. Upon detecting a meeting participant who is involved in a secondary conversation beginning to speak on the phone (or otherwise detecting the meeting participant beginning the process of answering/speaking on the phone), the hybrid meeting system can automatically set any secondary conversations in which the given meeting participant is involved to a private status. In some cases, the hybrid meeting system 400 can automatically exclude audio and/or visual data that includes the meeting participant's phone call, while otherwise maintaining the secondary conversation with a non-private (or partially non-private) status.

In one illustrative example, one or more of the gestures or cues used by hybrid meeting system 400 to identify a secondary conversation as being private (and/or as having transitioned from a private status to a non-private status, and vice versa) can be the same as or similar to a gesture or cue used to perform the initial detection of a secondary conversation between in-person participants 112a-e, as described above. For example, if a detected gesture or cue progresses beyond or otherwise exceeds a first threshold, the gesture or cue can be used to identify a conversation as a secondary conversation; if the same detected gesture or cue progresses beyond or otherwise exceeds a second threshold that is greater than the first threshold, then the gesture or cue can be used to identify the secondary conversation as being private. In the context of the above example (in which the detected gesture or cue is associated with an in-person participant turning his body away from the primary conversation and towards another in-person participant), a slight or moderate degree of body turn can indicate that that the in-person participant is associated with a secondary conversation, but that the secondary conversation remains non-private. If the in-person participant continues turning, or later achieves a high degree of body turn, then the hybrid meeting system 400 can determine that the in-person participant is instead associated with a secondary conversation that is intended to be private.

In another example, if an in-person participant partially covers their mouth with their hand, then hybrid meeting system 400 can determine that the in-person participant is associated with a secondary conversation, but that the secondary conversation is non-private. If the in-person participant completely covers their mouth (or covers their mouth beyond some second threshold, such as 75%), then the hybrid meeting system 400 can instead determine that the in-person participant is associated with a secondary conversation that is intended to be private.

In one illustrative example, hybrid meeting system 400 can determine that secondary conversation 334 (previously identified as non-private) has transitioned to being private in nature. Hybrid meeting system 400 can therefore identify a private secondary conversation 434 as occurring between in-person participants 112c and 112d. As illustrated in FIG. 4, in identifying the secondary conversation 434 as a private conversation, hybrid meeting system 400 can detect a gesture or cue that is based at least in part on distance or separation between in-person participants 112c and 112d. For example, in some cases hybrid meeting system 400 can identify secondary conversation 434 as having transitioned to a private status based on the distance or separation between in-person participants 112c and 112d being beneath a threshold associated with private conversation (e.g., the threshold for identifying secondary conversations as private can be defined in absolute terms). In some cases, hybrid meeting system 400 can identify secondary conversation 434 as having transitioned to a private status based on the distance or separation between in-person participants 112c and 112d falling below or otherwise changing with respect to a baseline separation distance previously established between the two in-person participants when their conversation was identified as non-private secondary conversation 334 (e.g., the threshold for identifying secondary conversations as private can be defined in relative terms).

In some cases, one or more detected gestures or cues used by hybrid meeting system 400 to identify a secondary conversation as having transitioned from a private status to a non-private status (and vice versa) can be determined from one or more audio signals associated with the secondary conversation. For example, auditory cues can include, but are not limited to, the detection of one or more keywords spoken by an in-person participant in the secondary conversation, a language or change in language used by one or more in-person participants in the secondary conversation, a volume level or change in volume level of one or more in-person participants in the secondary conversation, etc. In some examples, auditory cues detected by hybrid meeting system 400 can include a cadence and/or a change in a cadence associated with the speech of at least one in-person participant in a secondary conversation.

In one illustrative example, a previously identified private secondary conversation can subsequently be identified as a non-private secondary conversation based on a determination that at least one detected gesture or cue associated with the secondary conversation is inconsistent with a private status previously assigned to the secondary conversation. For example, in some cases a secondary conversation can be identified as having transitioned from private to non-private by analyzing subsequent gestures or cues against earlier gestures or cues, e.g., where the earlier gestures or cues are ones that triggered the prior identification of the secondary conversation as being private. For example, if a secondary conversation participant leans in and covers her mouth, then the secondary conversation can be initially identified as private. If subsequently, the secondary conversation participant is detected no longer leaning in and/or removes the hand covering her mouth, such an action can be identified as inconsistent with the earlier gesture that caused hybrid meeting system 400 to identify the secondary conversation as private. In response to detecting a gesture inconsistent with a previous private status assigned to a secondary conversation, hybrid meeting system 400 can automatically identify (or re-identify) the secondary conversation as now being a non-private secondary conversation.

As depicted in FIG. 4, when hybrid meeting system 400 identifies a secondary conversation (such as secondary conversation 434) as being private, hybrid meeting system 400 can automatically mute, filter, ignore, or remove at least a portion of the selectable secondary conversation option 484 provided by remote participant interface 480. In some examples, hybrid meeting system 400 may provide no visual indication and/or user interface elements for a secondary conversation that has been identified as private. In some cases, hybrid meeting system 400 can provide a reduced set of interaction options for a secondary conversation that has been identified as private. For example, the selectable secondary conversation option 484 can be grayed out or otherwise associated with a visual indication of the private status of secondary conversation 434. As illustrated, remote participant interface 480 can be configured to disable or remove a 'Join' option 496 that is associated with the private secondary conversation 434 (e.g., preventing a remote participant from using remote participant interface 480 to join the private secondary conversation 434, receive audio or visual data of the private secondary conversation 434, etc.). In some cases, the selectable secondary conversation option 484 can still be included in remote participant interface 480 even after hybrid meeting system 400 identifies the corresponding secondary conversation 434 as private.

In some cases, 'Join' option 496 can be disabled while 'Info' option 498 remains active, for example preventing remote participants from listening to or viewing audiovisual data of private secondary conversation 434 but permitting remote participants to view information such as the identities of the in-person participants 112c and 112d engaged in private secondary conversation 434. In some cases, information of the private secondary conversation 434 can be included in remote participant interface 480 to provide a realistic experience for the remote participants. When information of private secondary conversation 434 is made available, the experience or perception of remote participants can be the same as or similar to that of the remaining in-person participants 112a, 112b, and 112e. For example, the remaining in-person participants 112a, 112b, 112e may still be able to visually observe that in-person participants 112c and 112d are engaged in private secondary conversation 434, even if the remaining in-person participants cannot hear the words spoken in the private secondary conversation 434. In some examples, hybrid meeting system 400 can be configured such that selectable secondary conversation option 484 is entirely disabled or removed altogether from remote participant interface 480 in response to identifying secondary conversation 434 as being private.

Figure 5:
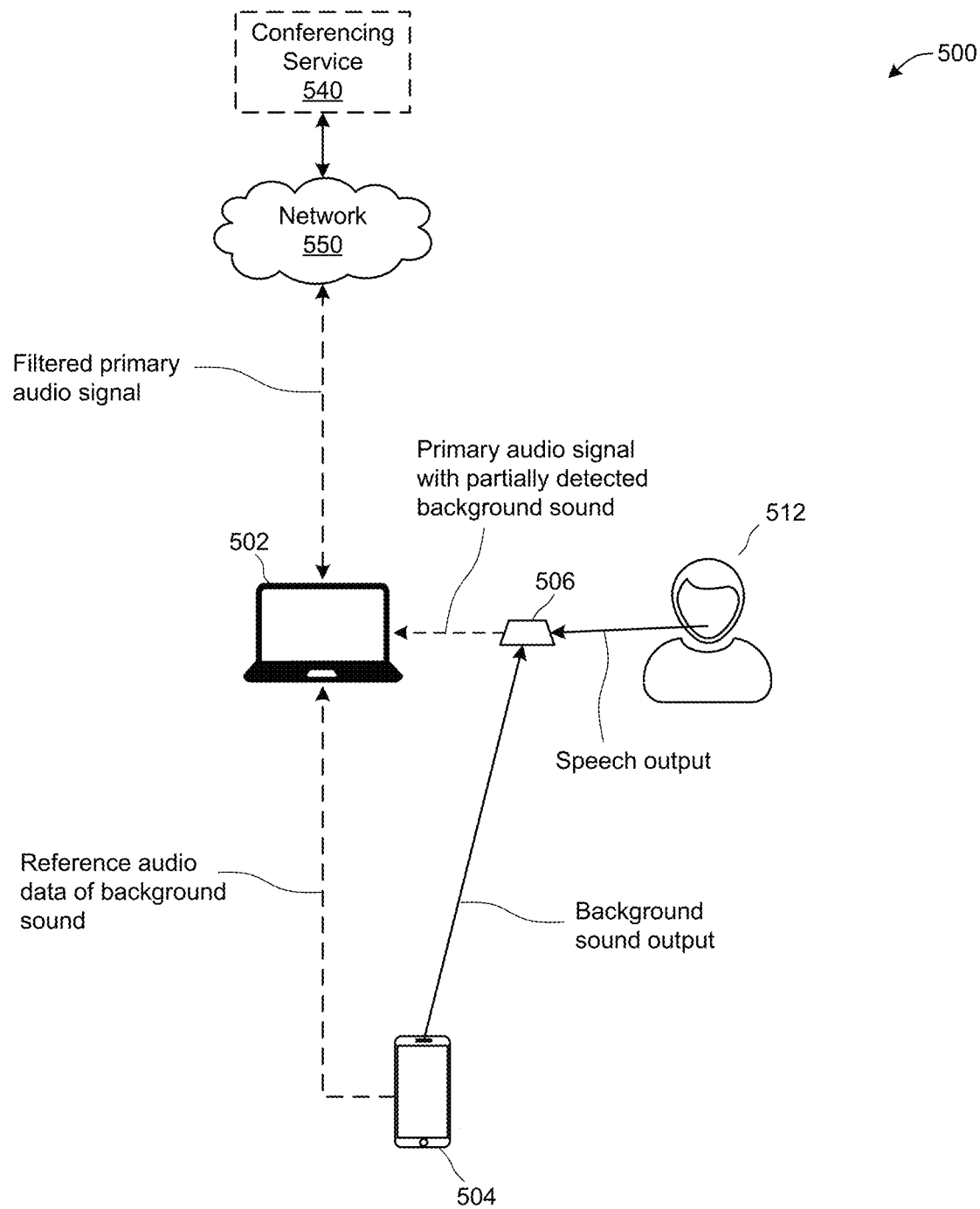
FIG. 5 is a block diagram illustrating an example of background noise removal from a participant audio stream, in accordance with some examples of the present disclosure.

FIG. 5 is a block diagram 500 illustrating an example of a background noise removal process as applied to a primary audio signal at a computing device 502 associated with a remote meeting participant 512. The remote participant computing device 502 can include or otherwise be associated with one or more microphones 506, which can be used to detect a spoken speech output of the remote meeting participant 512 (e.g., words spoken by remote meeting participant 512 while participating in a hybrid or online meeting). In some cases, the remote participant computing device 502 can be the same as, or similar to, one or more of the remote participant computing devices described previously with respect to one or more of FIGS. 1-4. In some examples, the remote meeting participant can be the same as, or similar to, one or more of the remote participants described previously with respect to FIGS. 1-4. As illustrated in FIG. 5, a primary audio signal obtained by the one or more microphones 506 can include both the spoken speech output of remote participant 512 and a partially detected background sound. The partially detected background sound can represent undesirable background noise that can interfere with or reduce the quality of the primary audio signal that is transmitted as remote participant 512's verbal contribution to a hybrid meeting associated with a hybrid meeting conferencing service 540.

As will be explained in greater depth below, FIG. 5 illustrates a scenario in which the background sound is output or otherwise generated by an additional computing device 504, which for example can be located in the same room or location (e.g., within a same vehicle) as the remote meeting participant 512 and the primary computing device 502. In some examples, the additional computing device 504 can be a smartphone or other personal computing device associated with remote meeting participant 512. In some cases, the additional computing device 504 can include (but is not limited to) a smartphone, laptop computer, desktop computer, tablet computer, gaming system, television, smart speaker, etc., that is owned by or associated with a relative, roommate, etc., who is within an auditory range of the one or more microphones 506 associated with the remote participant computing device 502. As mentioned previously, in some examples the additional computing device 504 can be associated with the remote participant computing device 502 but not with the hybrid meeting.

As depicted in FIG. 5, the additional computing device 504 can provide the remote participant computing device 502 with a reference audio data of a background sound that is being produced (or will be produced) by the additional computing device 504. Based on the reference audio data of the background sound, remote participant computing device 502 can filter out or remove the partially detected background sound from the primary audio signal obtained from the one or more microphones 506, thereby generating a filtered primary audio signal that can be transmitted to the networked hybrid meeting conferencing service 540.

In some examples, the remote meeting participant 512 can be included in one or more of the remote participants described above in the context of FIGS. 1-4. In some cases, the remote meeting participant 512 can be included in the remote participants 172a-c of FIG. 1. In some examples, the remote participant computing device 502 and/or the additional computing device 504 can be the same as or similar to one or more of the in-person participant computing devices and/or the remote participant computing devices described above with respect to FIGS. 1-4. As illustrated, FIG. 5 includes a networked conferencing service 540, which in some examples can be the same as or similar to the networked hybrid meeting conferencing service 140 described above with respect to FIGS. 1-4.

In one illustrative example, background noise cancellation can be performed locally at a processor of the remote participant computing device 502. In some examples, background noise cancellation can be performed at least in part at a server or other computing device that is located remotely from the computing device 502. As illustrated in FIG. 5, an additional computing device 504 produces a background sound output within an auditory range of the one or more microphones 506 associated with the remote participant's computing device 502. For example, the background sound output can be produced by a speaker or other audio output device provided on or associated with the additional computing device 504. In some cases, the additional computing device 504 can be a tablet or smartphone located in the same room as the remote participant 512. The background noise output that is detected, at least partially, in the primary audio signal from the one or more microphones 506 associated with remote participant computing device 502 can include a ringtone or notification played by the additional computing device 504. In some cases, a background noise output produced by the additional computing device 504 can include music or sound effects associated with a game, movie, or other audio and/or audiovisual content being output on the additional computing device 504.

In some aspects, the additional computing device 504 can automatically suppress some or all of the sounds and/or audio that are scheduled for output by the additional computing device 504. For example, the additional computing device 504 can automatically suppress some or all of the sounds and/or audio that are provided for output by a speaker associated with additional computing device 504. In some cases, additional computing device 504 can perform automatic sound suppression based on the association between additional computing device 504 and the remote participant computing device 502. For example, additional computing device 504 can perform automatic sound suppression in response to the remote participant computing device 502 attending a hybrid meeting, in response to a microphone or camera of the remote participant computing device 502 being activated during a hybrid meeting, etc. In some cases, the automatic sound suppression at additional computing device 504 can be based at least in part on a determination that the remote participant computing device 502 is being used to attend a hybrid meeting and that the additional computing device 504 is within a pre-determined range of the remote participant computing device 502. In some cases, the pre-determined range can include an auditory threshold (e.g., a distance within which sounds output by the additional computing device 504 may be picked up by a microphone associated with the remote participant computing device 502).

Because the additional computing device 504 is located within an auditory range of the one or more microphones 506 associated with the remote participant's primary computing device 502, the one or more microphones 506 may therefore output a primary audio signal which includes both spoken speech of the remote participant 512 and at least a partial detection of the background sound output produced by the additional computing device 504.

In some examples, discovery can be performed between the remote participant computing device 502 and additional computing device 504 in an automatic and/or continual fashion. In one illustrative example, discovery can be performed between remote participant computing device 502 and additional computing device 504 in response to a hybrid meeting being initialized at remote participant computing device 502 (e.g., as part of an audio initialization step that determines one or more characteristics of an audio environment surrounding or otherwise associated with remote participant 512 and/or the one or more microphone 506 associated with the remote participant computing device 502). In another illustrative example, discovery can be performed between remote participant computing device 502 and additional computing device 504 in response to background noise being detected in the primary audio signal captured by the one or more microphones 506 and provided to the remote participant computing device 502 and/or the networked hybrid meeting conferencing service 540. In some examples, discovery between remote participant computing device 502 and additional computing device 504 can be triggered or otherwise mediated by the networked conferencing service 540, which may be in communication with one or more of the remote participant computing device 502 and the additional computing device 504.

The discovery process can be used to establish a communication session or link between the remote participant computing device 502 and the additional computing device 504 (e.g., indicated in FIG. 5 as the dotted line between computing devices 502 and 504). In some examples, once established, the additional computing device 504 can use the communication session or link to provide remote participant computing device 502 with reference audio data of any sounds that are being output, or will shortly be output, by the additional computing device 504 (e.g., indicated in FIG. 5 as 'Reference audio data of background sound'). For example, the reference audio data received by remote participant computing device 502 can include a copy or indication of an audio data file that is also being output by a speaker of additional computing device 504. Based on the received audio data file or other reference audio data received from additional computing device 502, remote participant computing device 502 can filter out or remove from the primary audio signal a representation or partial detection of the background sound output produced by additional computing device 502.

In some examples, remote participant computing device 502 can use the reference audio data of the background sound (received from additional computing device 504) to actively identify and filter out a representation of the same background sound output included in the primary audio signal obtained using the one or more microphones 506. In some examples, the representation of the background sound output included in the primary audio signal can be identified and filtered out to the extent that a representation of the background sound output is included in the primary audio signal. For example, based on the distance between additional computing device 504 (the source of the background sound output) and the one or more microphones 506 (which receive the background sound output), the background sound output may be only partially detected or partially represented in the primary audio signal output by the one or more microphones.

In one illustrative example, remote participant computing device 502 can include and/or apply one or more adaptive filters to remove partially detected background sound outputs from the primary audio signal obtained from the one or more microphones 506. The one or more adaptive filters can remove the partially detected background sound output(s) from the primary audio signal such that only locally detected sounds of the remote participant's speech output remain in the resulting filtered primary audio signal. As mentioned previously, the background sound or noise filtering can be performed by remote participant computing device 502 using corresponding reference audio data of the background sound received from the additional computing device 504. In some examples, the background sound or noise filtering can be performed at least in part by one or more servers or cloud computing devices that are located remotely from the remote participant computing device 502 but communicatively coupled via network 550.

Although FIG. 5 illustrates only a single remote participant computing device 502 and a single additional computing device 504, in some examples the background noise filtering and cancellation described above can be extended to shared acoustic spaces with multiple additional computing devices each acting as a source of background sound output(s). In one illustrative example, discovery can be performed by the remote participant computing device 502 to detect one or more additional computing devices located within an auditory range of the one or more microphones 506, and similar background noise cancellation configurations as described above can be formed for each combination of remote participant computing device 502 and one of the additional computing devices 504.

Figure 6:
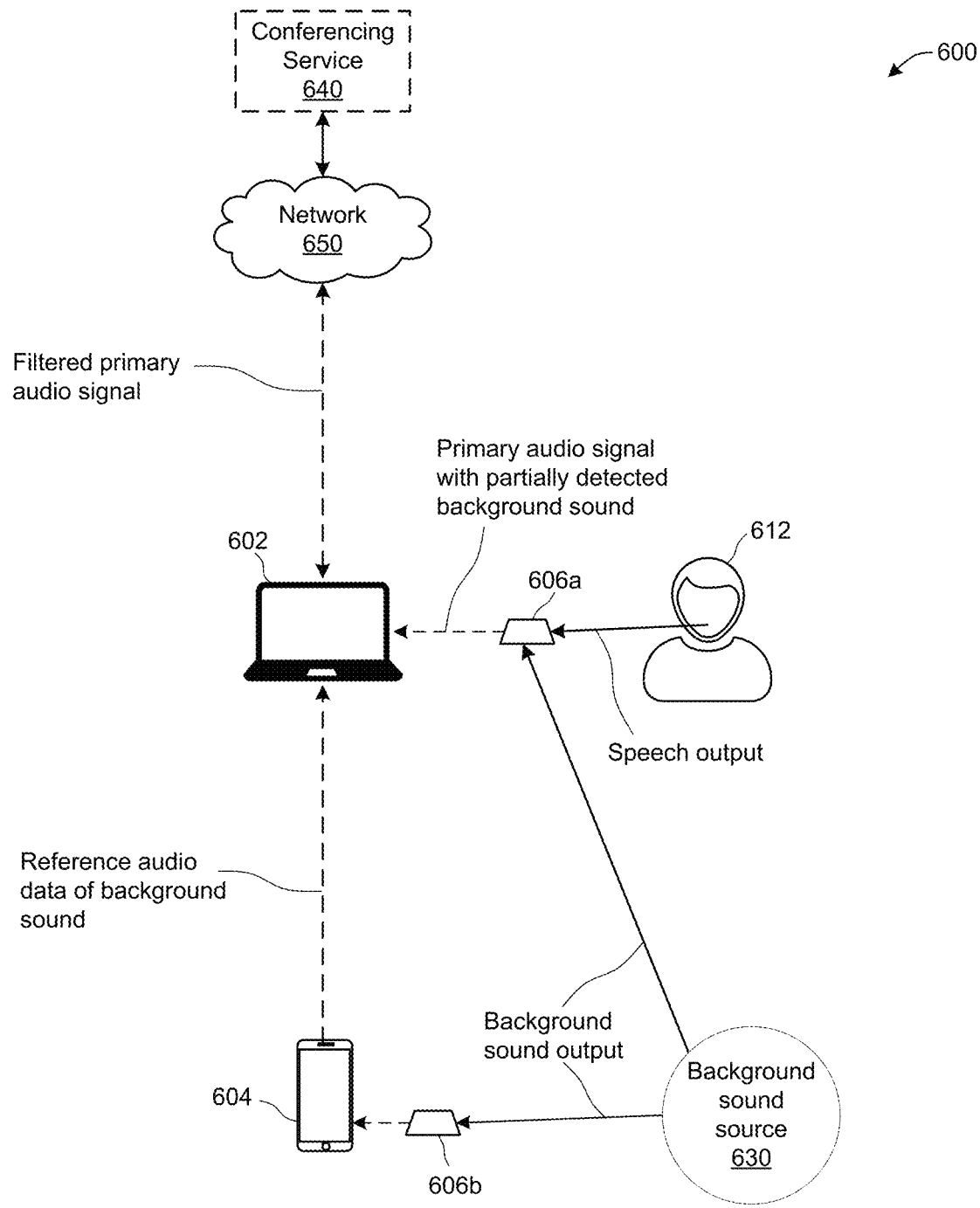
FIG. 6 is a block diagram illustrating another example of background noise removal from a participant audio stream, in accordance with some examples of the present disclosure.

FIG. 6 is a block diagram 600 illustrating an example of a background noise removal process as applied to a primary audio signal at a computing device 602 associated with a remote meeting participant 612 participating in a meeting provided by a hybrid meeting conferencing service 640 via a network 650. In some examples, one or more of the computing device 602 and/or the remote meeting participant 612 can be the same as or similar to the computing device 502 and the remote meeting participant 512 described above with respect to FIG. 5. As illustrated, the remote participant computing device 602 can include or otherwise be associated with one or more microphones 606a, which in some cases can be the same as the one or more microphones 506 (e.g., used to detect a spoken speech output of the remote participant that is can subsequently be provided to a hybrid meeting).

As illustrated in FIG. 6, a primary audio signal obtained by the one or more microphones 606a can include both the spoken speech output of remote participant 612 and a partially detected background sound. Whereas FIG. 5 illustrated a scenario in which a background sound output was produced by an additional device 504, FIG. 6 illustrates a scenario in which a background sound output is produced by a background sound source 630 that is separate from and/or different than the additional computing device 604. In some examples, the additional computing device 604 can be the same as or similar to the additional computing device 504 described with respect to FIG. 5.

For example, the additional computing device 604 can be located in the same room or auditory environment as the remote meeting participant 612 and the primary computing device 602. In some examples, the additional computing device 604 can be a smartphone or other personal computing device associated with remote meeting participant 612. In some cases, the additional computing device 604 can be a smartphone, laptop computer, desktop computer, tablet computer, gaming system, television, etc., that is owned by or associated with a relative, roommate, etc., who is within an auditory range of the one or more microphones 606a associated with the remote participant computing device 602.

Similar to as was described above with respect to the additional computing device 504 of FIG. 5, the additional computing device 604 of FIG. 6 can provide the remote participant computing device 602 with a reference audio data of a background sound. Remote participant computing device 602 can subsequently use the reference audio data of the background sound (as received from additional computing device 604) to filter out a representation of the same partially detected background sound as included in the primary audio signal (as obtained by the one or more microphones 606a associated with the remote participant computing device 602). As illustrated, remote participant computing device 602 can generate a filtered primary audio signal by filtering out the partially detected background sound as included in the primary audio signal. The filtered primary audio signal can subsequently be transmitted to the networked hybrid meeting conferencing service, which can be the same as the networked hybrid meeting conferencing service 140 and/or 540, as described above.

In the context of FIG. 6, the additional computing device 604 can include or otherwise be associated with one or more microphones 606b that are used to detect the background sound output produced by background sound source 630. In some examples, additional computing device 604 can be a smartphone or other personal computing device or mobile computing device, and the one or more microphones 606b can be included in the additional computing device 604.

In some examples, based on an auditory range or auditory proximity between the remote participant computing device 602, the additional computing device 604, and the background sound source 630, a background sound output produced by background sound source 630 can be detected by the one or more microphones 606a and the one or more microphones 606b. The primary audio signal obtained by the one or more microphones 606a associated with the remote participant computing device 602 can be include the spoken speech output of the remote participant 612 and at least a partial detection of the background sound output produced by the background sound source 630. Portions of the primary audio signal that match or are otherwise similar portions of the reference audio data of background sound likely represent background noise and can be filtered out or removed from the primary audio signal. As was described with respect to the background noise filtering process discussed with respect to FIG. 5, in some examples the reference audio data of the background sound received from additional device 604 can be used to filter the primary audio signal locally (e.g., at or by a processor of remote participant computing device 602). In some examples, the reference audio data of the background sound received from additional device 604 can be used to filter the primary audio signal remotely (e.g., at a server or cloud computing device that is located remotely from the remote participant computing device 602).

In some cases, the background sound filtering or removal described herein can be based at least in part on the loudest portions of the reference audio data received from the additional computing device 604. For example, background sound may be louder as detected at the one or more microphones 606b associated with additional computing device 604 than as detected at the one or more microphones 606a associated with remote participant computing device 604 (e.g., because the source of the background sound may be in closer proximity to the additional computing device than to the remote participant's computing device). In some examples, the loudest portions of the reference audio data of the background sound can be filtered out or removed from the primary audio signal obtained from the one or more microphones 606a. In some cases, portions of the reference audio data of the background sound that are above a predetermined loudness threshold can filtered out or removed from the primary audio signal obtained from the one or more microphones 606a. In some examples, the remote participant computing device 602 can include and/or apply one or more adaptive filters to filter out or remove the representation of the background sound output as detected or included in the primary audio signal obtained from the one or more microphones 606a (e.g., as described above with respect to FIG. 5).

Figure 7:
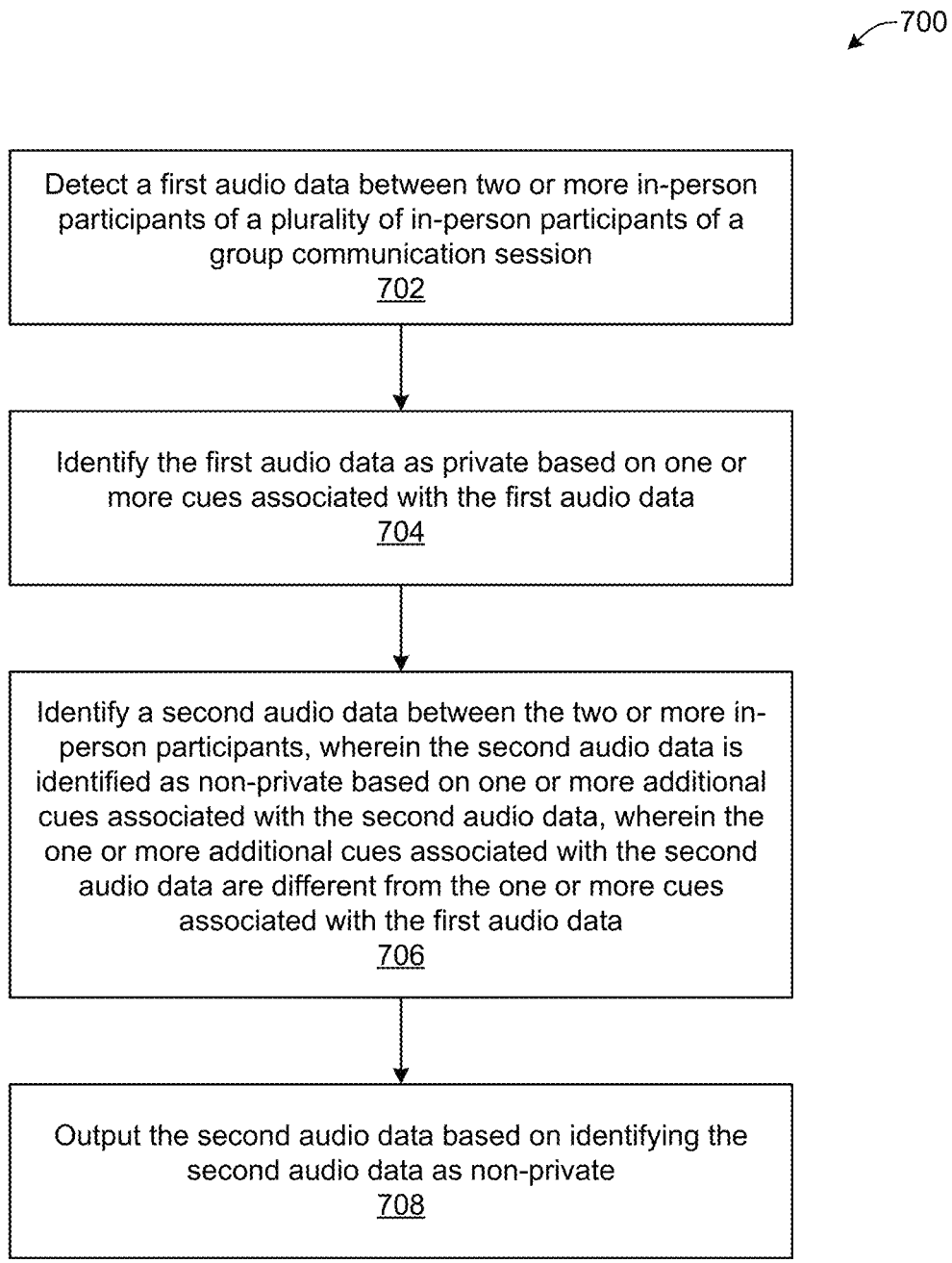
FIG. 7 is a flow diagram illustrating an example of a process for processing audio data, in accordance with some examples of the present disclosure.

FIG. 7 is a flow diagram illustrating an example of a process 700 of processing audio data. Although the example process 700 depicts a particular sequence of operations, the sequence may be altered without departing from the scope of the present disclosure. For example, some of the operations depicted may be performed in parallel or in a different sequence that does not materially affect the function of the process 700. In some examples, different components of an example device or system that implements the process 700 may perform functions at substantially the same time or in a specific sequence.

At block 702, the process 700 includes detecting a first audio data between two or more in-person participants of a plurality of in-person participants of a group communication session. In some examples, detecting the first audio data can include detecting a secondary conversation between two or more in-person participants of a plurality of in-person participants of a hybrid meeting. For example, the one or more of the hybrid meeting systems 100, 200, 300, and 400 illustrated in FIGS. 1, 2, 3 and 4, respectively, can detect the first audio data between two or more in-person participants of a group communication session (e.g., a hybrid meeting). In some examples, the hybrid meeting conferencing service 140 illustrated in FIGS. 1-4 can be used to detect the first audio data between the two or more in-person participants of the group communication session.

In some examples, the process 700 can further include detecting a primary conversation that includes a first in-person participant of the group communication session. In some cases, the first in-person participant included in the primary conversation can be different from the two or more in-person participants included in the first audio data (e.g., a secondary conversation). In some examples, the first audio data can be detected as a secondary conversation that includes at least one remote participant in a group communication session (e.g., a hybrid meeting). In one illustrative example, the first audio data can be detected as a secondary conversation, wherein the secondary conversation is detected at a location of the at least one remote participant. For example, detecting the first audio data can include detecting a secondary conversation between a first remote participant and a second remote participant, wherein the first and second remote participants are co-located (e.g., located in the same room, location, etc.). In some cases, the first audio data can be detected as a secondary conversation between at least one remote participant of a group communication session and an individual who is not participating in, attending, or otherwise associated with the group communication session. For example, a secondary conversation can be detected between a remote participant and his or her child or spouse.

At block 704, the process 700 includes identifying the first audio data as private based on one or more cues associated with the first audio data. For example, one or more of the hybrid meeting systems 100-400 illustrated in FIGS. 1-4, respectively, and/or the hybrid meeting conferencing service 140 illustrated in FIGS. 1-4 can be used to identify the first audio data as private based on one or more cues. In some examples, the one or more cues associated with first audio data can be based on one or more of keyword detection, an analysis of audio signals obtained from one or more microphones associated with the group communication session, a posture of one or more participants of the group communication session, one or more gestures of one or more participants of the group communication session, and/or one or more movements of one or more participants of the group communication session. In some examples, the process 700 can further include outputting audio of the primary conversation and excluding the first audio data from being output, based on identifying the first audio data as private. For example, the remote participant interface 480 illustrated in FIG. 4 can be used to output audio of a primary conversation 332 using a selectable primary conversation option 382. In some examples, the remote participant interface 480 illustrated in FIG. 4 can be used to exclude audio of a secondary conversation 434 (e.g., first audio data) from being output, for example by disabling or removing a 'Join' option 496 associated with a selectable secondary conversation option 484.

At block 706, the process 700 includes identifying a second audio data between the two or more in-person participants, wherein the second audio data is identified as non-private based on one or more additional cues associated with the second audio data, wherein the one or more additional cues associated with the second audio data are different from the one or more cues associated with the first audio data. In some cases, identifying the second audio data can include identifying a secondary conversation as transitioning to a non-private status based on one or more additional cues associated with the secondary conversation, wherein the one or more additional cues are different from the one or more cues. In one illustrative example, one or more of the hybrid meeting systems 100-400 illustrated in FIGS. 1-4, respectively, and/or the hybrid meeting conferencing service 140 illustrated in FIGS. 1-4 can be used to identify the second audio data as non-private based on the one or more additional cues associated with the second audio data. In some examples, the one or more additional cues associated with the second audio data are different from the one or more cues associated with the first audio data.

In some examples, the one or more additional cues associated with the second audio data are inconsistent with the one or more cues associated with the first audio data, where the one or more cues were previously used to identify the first audio data as private. In some examples, a secondary conversation (e.g., including at least the first audio data) can be identified as transitioning to non-private based on a non-privacy indication determined from the one or more cues and/or the one or more additional cues. In some examples, a secondary conversation can be identified as transitioning to private based on a privacy indication determined from the one or more cues and/or the one or more additional cues.

At block 708, the process 700 includes outputting the second audio data based on identifying the second audio data as non-private. For example, one or more of the hybrid meeting systems 100-400 illustrated in FIGS. 1-4, respectively, and/or the hybrid meeting conferencing service 140 illustrated in FIGS. 1-4 can be used to identify the second audio data as non-private. In some examples, the outputted second audio data includes audio of a secondary conversation obtained after identifying the second audio data as non-private. In some examples, the first audio data and the second audio data can be part of the same secondary conversation. In some examples, outputting the second audio data comprises providing a first selectable option for a primary conversation and a second selectable option for at least a portion of a secondary conversation, wherein the primary conversation and the secondary conversation are detected for the same group communication session. In some examples, outputting the second audio data comprises merging the second audio data with audio of the primary conversation.

Figure 8:
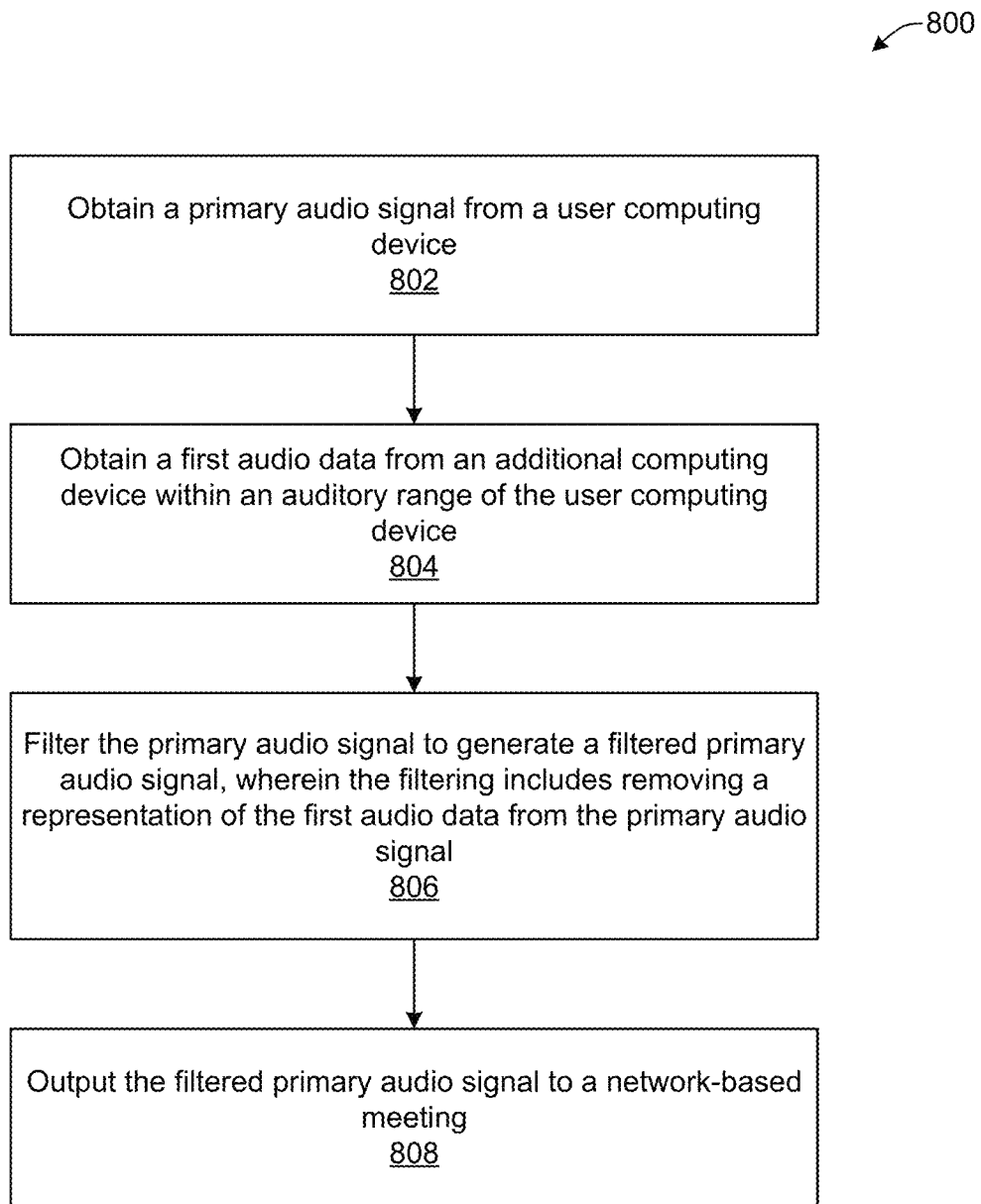
FIG. 8 is a flow diagram illustrating another example of a process for processing audio data, in accordance with some examples of the present disclosure.

FIG. 8 is a flow diagram illustrating an example of a process 800 of processing audio data. Although the example process 800 depicts a particular sequence of operations, the sequence may be altered without departing from the scope of the present disclosure. For example, some of the operations depicted may be performed in parallel or in a different sequence that does not materially affect the function of the process 800. In some examples, different components of an example device or system that implements the process 800 may perform functions at substantially the same time or in a specific sequence.

At block 802, the process includes obtaining a primary audio signal from a user computing device. In some examples, the primary audio signal can be obtained using one or more microphones associated with the user computing device. For example, the primary audio signal can be obtained from the one or more microphones 506 associated with the remote participant computing device 502 illustrated in FIG. 5. In some examples, the primary audio signal can be obtained from the one or more microphones 606a associated with the remote participant computing device 602 illustrated in FIG. 6. In some examples, the primary audio signal can include spoken speech output of remote participant, such as the remote participant 512 illustrated in FIG. 5 and/or the remote participant 612 illustrated in FIG. 6. In some examples, the primary audio signal can further include a partially detected background sound output.

At block 804, the process 800 includes obtaining first audio data from an additional computing device within an auditory range of the user computing device. In some examples, the first audio data can be obtained from the additional computing device by the user computing device. In some examples, the first audio data can include reference audio data of a background sound. In some examples, the first audio data can be obtained from an additional computing device such as the additional computing device 504 illustrated in FIG. 5 and/or the additional computing device 604 illustrated in FIG. 6. For example, the additional computing device can include a smartphone, a laptop computer, a desktop computer, a gaming system or device, etc. The first auditory range can be determined such that a background sound output produced by the additional device can be at least partially detected by the one or more microphones associated with the user computing device (e.g., as illustrated in FIG. 5). In some examples, the first auditory range can be determined such that a background sound output produced by a separate background sound source such as the background sound source 630 illustrated in FIG. 6 can be detected by the one or more microphones 606a associated with a user computing device 602 and can be detected by the one or more microphones 606b associated with an additional computing device 604 (e.g., as illustrated in FIG. 6).

In some examples, the user computing device can receive the first audio data prior to the first audio data being used to generate an audio output at the additional computing device. For example, the user computing device 502 illustrated in FIG. 5 can receive the first audio data (as a reference audio data of background sound) before the first audio data is used to generate a background sound output at additional device 504, as also illustrated in FIG. 5. In some examples, the first audio data includes a first background sound as detected by one or more microphones associated with the additional computing device. For example, the first audio data can include reference audio data of a first background sound output as detected by the one or more microphones 606b associated with the additional computing device 604, as illustrated in FIG. 6.

At block 806, the process 800 includes filtering the primary audio signal to generate a filtered primary audio signal, wherein the filtering includes removing a representation of the first audio data from the primary audio signal. For example, one or more of the remote participant computing device 502 illustrated in FIG. 5 and/or the remote participant computing device 602 illustrated in FIG. 6 can be used to filter the primary audio signal to generate a filtered primary audio signal. In some examples, the representation of the first audio data can be included in the primary audio signal. In some examples, the representation of the first audio data comprises the audio output generated at an additional computing device, as detected by the one or more microphones associated with the user computing device. For example, the representation of the first audio data can comprise an audio data file used to produce a background sound output at additional device 504, as illustrated in FIG. 5. In some examples, the representation of the audio output generated at additional computing device 504 can be detected by the one or more microphones 506 associated with the primary computing device 502, as illustrated in FIG. 5. In some examples, the representation of the first audio data comprises at least a partial detection of a first background sound output produced by a background sound source 630, as detected by the one or more microphones 606a associated with the user computing device 602, as illustrated in FIG. 6.

At block 808, the process 800 includes outputting the filtered primary audio signal to a network-based meeting. For example, one or more of the remote participant computing device 502 illustrated in FIG. 5 and/or the remote participant computing device 602 illustrated in FIG. 6 can output the filtered primary audio signal to the network-based meeting. In some examples, the network-based meeting can be a hybrid meeting. The hybrid meeting can be provided by the networked hybrid meeting conferencing service 540 and/or 640 illustrated in FIGS. 5 and 6, respectively. In some examples, the hybrid meeting can be provided by one or more of the hybrid meeting systems 100-400 illustrated in FIGS. 1-4, respectively, and/or the hybrid meeting conferencing service 140 illustrated in FIGS. 1-4.

In some examples, the process 800 further includes filtering the primary audio signal at least in part by using a second audio signal and/or a reference audio data of a background sound to attenuate a representation of the background sound detected in the primary audio signal. For example, the reference audio data can include the reference audio data of background sound transmitted to remote participant computing device 502 by additional computing device 504, as illustrated in FIG. 5, and/or can include the reference audio data of background sound transmitted to remote participant computing device 602 by additional computing device 604, as illustrated in FIG. 6. In some examples, attenuating the representation of the second audio signal detected in the primary audio signal comprises applying a scaling factor to the second audio signal to generate a scaled second audio signal and subtracting the scaled second audio signal from the primary audio signal. In some examples, attenuating the representation of the second audio signal detected in the primary audio signal comprises identifying one or more portions of the second audio signal having a magnitude greater than a pre-determined threshold. In some examples, the magnitude of the second audio signal can be a loudness of the second audio signal. In some examples, one or more of the identified portions of the second audio signal can be subtracted from the primary audio signal to generate the filtered primary audio signal output by one or more of remote participant computing device 502 illustrated in FIG. 5 and/or remote participant computing device 602 illustrated in FIG. 6.

In some examples, the processes described herein (e.g., process 700, process 800, and/or other process described herein) may be performed by a computing device or apparatus. In one example, one or more of the processes can be performed by the hybrid meeting systems 100, 200, 300, and 400 illustrated in FIGS. 1, 2, 3, and 4, respectively. In another example, one or more of the processes can be performed by the computing device 900 shown in FIG. 9. In another example, one or more of the processes can be performed by the computing system 1000 shown in FIG. 10. For instance, a computing device with the computing system 1000 shown in FIG. 10 can include the components of the hybrid meeting systems 100-400 and can implement the operations of the process 700 of FIG. 7, the operations of the process 800 of FIG. 8, and/or other process described herein.

The computing device can include any suitable device, such as a vehicle or a computing device of a vehicle (e.g., a driver monitoring system (DMS) of a vehicle), a mobile device (e.g., a mobile phone), a desktop computing device, a tablet computing device, a wearable device (e.g., a VR headset, an AR headset, AR glasses, a network-connected watch or smartwatch, or other wearable device), a server computer, a robotic device, a television, and/or any other computing device with the resource capabilities to perform the processes described herein, including the process 700, the process 800, and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 700 and the process 800 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700, the process 800, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
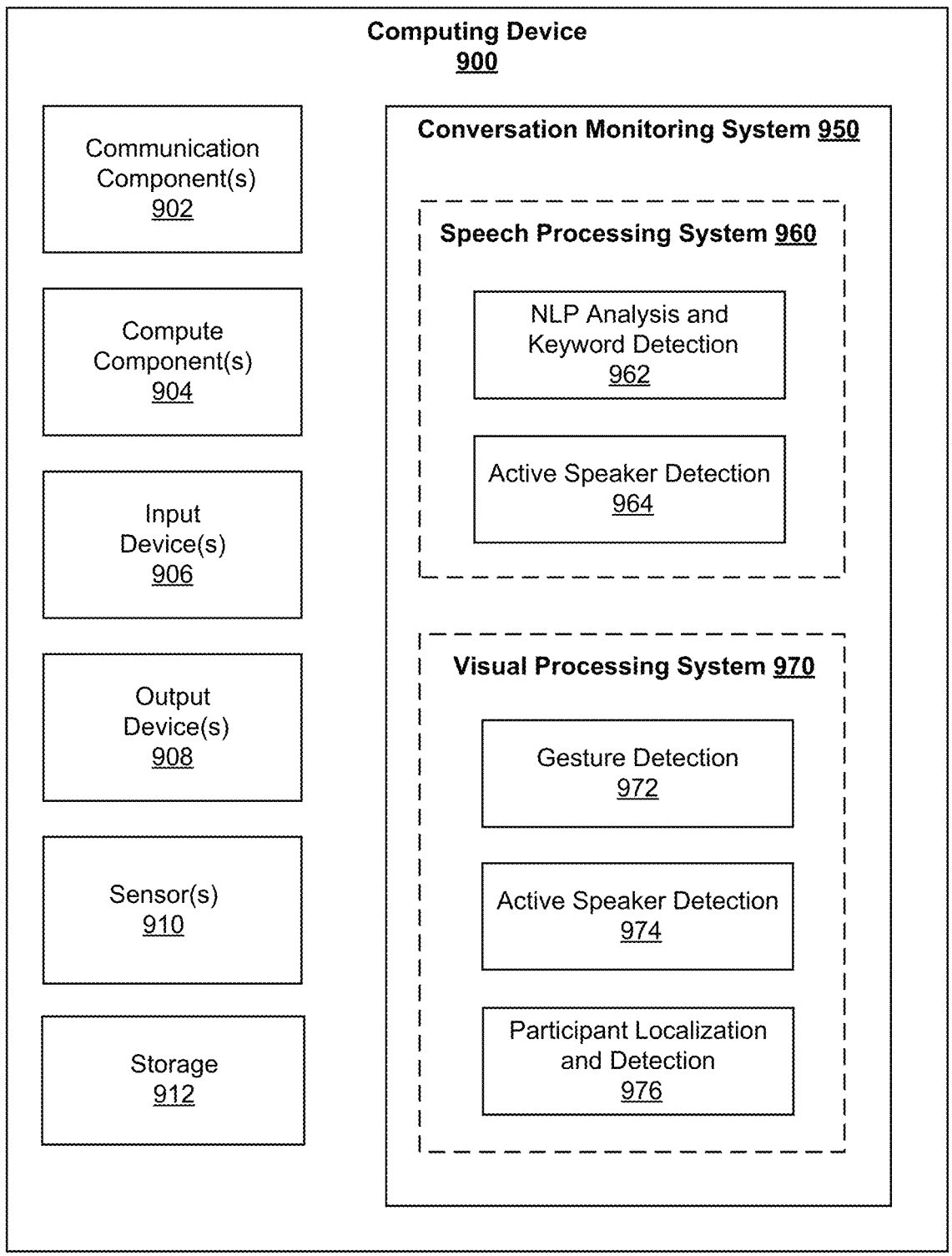
FIG. 9 is a block diagram illustrating an example architecture of a computing device that can be used to provide a conversation monitoring system, in accordance with some examples of the present disclosure.

FIG. 9 is a block diagram illustrating an example architecture of a computing device 900 that can used to provide one or more aspects of the presently described hybrid meeting systems and techniques. In some examples, the computing device 900 can represent one or more of the computing devices 102a-102c and 104 associated with the in-person participants 112a-e as described above, and/or can represent one or more of the computing devices 162a, 162b, 164a, and 164c associated with the remote participants 172a-c as also described above. In some examples, the computing device 900 can represent one or more computing devices that are associated with venue 110 or are otherwise used to provide a hybrid meeting and/or hybrid meeting system as described herein. In some cases, the computing device 900 can represent one or more computing devices associated with the example hybrid meeting systems 100, 200, 300, 400, or one or more components or portions thereof. In some cases, the computing device 900 can represent one or more of the computing devices 502, 504, 602, and 604.

The computing device 900 can include various personal computing devices and/or mobile computing devices. For example, computing device 900 can include a smartphone, a smart wearable device (e.g., a smart watch, smart earbuds), an extended reality (XR) system or device (e.g., smart glasses, a head-mounted display (HMD), etc.), a virtual reality (VR) system or device, an augmented reality (AR) system or device, a smart television, a game system, a tablet computer, a laptop computer, a desktop computer, an IP phone, a desk phone, an IoT device, etc.

In the example shown in FIG. 9, the computing device 900 can include one or more communication components 902, one or more compute components 904, one or more input devices 906, one or more output devices 908, one or more sensors 910, a storage 912, a conversation monitoring system 950, a speech processing system 960, an NLP analysis and keyword detection system 962, an active speaker detection system 964, a visual processing system 970, a gesture detection system 972, an active speaker detection system 974, and/or a participant localization and detection system 976.

While the computing device 900 is shown to include certain components, one of ordinary skill in the art will appreciate that the computing device 900 can include more or fewer (and/or different) components than those shown in FIG. 9. For example, the computing device 900 can include, in some instances, one or more memory devices (e.g., RAM, ROM, cache, and/or the like), one or more cameras, and/or any other hardware or processing devices that are not shown in FIG. 9. An illustrative example of a computing device and hardware components that can be implemented with the computing device 900 is described below with respect to FIG. 10.

In some examples, the one or more communication components 902 can include a cellular antenna for communicating over cellular networks, a WiFi antenna for communicating over a wireless local area network (WLAN), a network interface for connecting the computing device 900 to a data network (e.g., wired and/or wireless network), and/or an interface component for connecting the computing device 900 to a telephone landline. In some cases, the one or more communication components 902 can also include other antennas or communication interfaces such as, for example, a Bluetooth antenna, a GPS antenna, and/or any other suitable hardware component for sending and/or receiving wired and/or wireless signals. The computing device 900 can use the one or more communication components 902 to establish, and participate in, a hybrid meeting. The computing device 900 can also use the one or more communication components 902 to send and receive data from other devices.

The one or more compute components 904 can include a central processing unit (CPU), a graphics processing unit (GPU), a digital signal processor (DSP), an image signal processor (ISP), an application-specific integrated circuit (ASIC), a controller device, and/or any other processing device. The one or more compute components 902 can perform various operations and can manage/control other components on the computing device 900, including the one or more communication components 902, the one or more input devices 906, the one or more output devices 908, the one or more sensors 910, and the storage 912. Moreover, the compute components 904 can implement one or more of the conversation monitoring system 950, the speech processing system 960, the NLP analysis and keyword detection system 962, the active speaker detection system 964, the visual processing system 970, the gesture detection system 972, the active speaker detection system 974, and/or the participant localization and detection system 976. In some examples, the compute components 904 can also implement one or more other processing engines.

The one or more input devices 906 can include a keypad, a touch screen, a microphone, an image sensor, a controller, a keyboard, a pointing device, and/or any other input device capable of receiving a user input in any modality of input (e.g., mechanical motion, audio, visual, etc.). A user can use the one or more input devices 906 to manage a hybrid meeting or interact with or otherwise participate in a hybrid meeting, interact with the computing device 900, provide inputs, and activate and/or manage one or more features and/or controls, such as a hold monitoring feature, a mute function, a record function, volume controls, hybrid meeting settings, call settings, etc.

The one or more output devices 908 can include a speaker. In some examples, the one or more output devices 908 can also include a display and/or component capable of outputting data. For example, in some cases, the one or more output devices 908 can include a touch screen capable of displaying content and receiving user inputs.

The one or more sensors 910 can include, for example, an inertial measuring unit (IMU), an image sensor (e.g., camera sensor), an accelerometer, a gyroscope, a magnetometer, an altimeter, a tilt sensor, a motion detection sensor, a light sensor, an audio sensor, a light detection and ranging (LIDAR) device, a proximity sensor, an orientation sensor, and/or any other sensor. The one or more sensors 910 can be used to detect an object, detect a location of an object, detect one or more conditions (e.g., light, motion, etc.), capture data (e.g., image data, audio, etc.), measure one or more characteristics of an object or environment (e.g., orientation, shape, size, state, etc.), collect specific types of measurements, etc.

The storage 912 can be any storage device(s) for storing data, such as image data, files, software, videos, text data, messages, device/component profiles, user profiles, audio profiles, settings, user inputs, network data, etc. Moreover, the storage 912 can store data from any of the components of the computing device 900. For example, the storage 912 can store data from the one or more communication components 902, the one or more compute components 904, the one or more input devices 906, the one or more output devices 908, the one or more sensors 910, the conversation monitoring system 950, the speech processing system 960, the NLP analysis and keyword detection system 962, the active speaker detection system 964, the visual processing system 970, the gesture detection system 972, the active speaker detection system 974, and/or the participant localization and detection system 976.

In some examples, the speech processing system 960 can include an automatic speech recognition engine that can analyze speech input and recognize the speech and/or the semantic meaning of the speech in the speech input. In some cases, the automatic speech recognition engine can implement one or more grammars to recognize speech utterances. The one or more grammars can be specific to a speech domain or can cover multiple speech domains. For example, the automatic speech recognition engine can implement a grammar specific to a spoken language, a dialect, a use case scenario (e.g., business organization, educational setting, personal or entertainment setting, etc.).

In some cases, the speech processing system 960 can implement feature normalization or adaptation algorithms to account for speaker and/or acoustic variability. For example, the acoustic variability can differ in a mobile context and an office context where background noise can be better controlled and minimized. Thus, the speech processing system 960 can implement feature normalization or adaptation algorithms to account for the acoustic variability in certain domains.

In some examples, the speech processing system 960 can implement a spoken dialog engine. The spoken dialog engine can aim to identify a user's intent as expressed in natural language, and take specific actions based on the identified intent. Such a natural language spoken dialog engine can include the automatic speech recognition engine previously described, as well as other components such as a spoken language understanding engine, a dialog management engine, a synthesizing engine, etc.

The spoken language understanding engine can use a natural language understanding model to analyze words in a speech input to derive a meaning from the speech input. The dialog management engine can interact with a user in a natural way and help the user achieve certain tasks. For example, the dialog management engine can receive the meaning of a speech input from the spoken language understanding engine and determine an action such as, for example, providing a prompt or response to the user. The synthesizing engine can be any type of speech output engine. For example, the synthesizing engine can be an engine that selects a prerecorded speech segment and outputs the prerecorded speech segment to the user.

In this way, the speech processing system 960 and/or a spoken dialog engine implemented by the speech processing system 960 can recognize speech input, such as speech utterances, identify (or understand) the meaning of the speech, and determine a response to the speech input, which can be output to the user. In this manner, the user can carry on a natural language dialog with the computing device 900 and/or the presently described hybrid meeting systems. For example, the user can provide a voice command to the computing device 900, such as a voice command, which the speech processing system 960 can recognize and respond to the voice command, provide a prompt or speech output to the user (e.g., a confirmation, a message, a notification, etc.), and/or carry a natural language dialog with the user.

As previously noted, the speech processing system 960 can implement a keyword detection system 962 for detecting certain keywords uttered in the context of a hybrid meeting (e.g., in a primary conversation and/or a secondary conversation). The keyword detection system 962 can continuously monitor the hybrid meeting and associated conversations for any predefined keyword, as described above. Accordingly, the keyword detection system 962 can maintain a grammar of such keywords to detect any time such keywords are uttered/transmitted in a hybrid meeting or an associated conversation. The speech processing system 960 can also implement an active speaker detection system 964 to detect a voice transition. The voice transition can include a transition from a first speech/voice to silence, a transition from a first speech/voice to a second speech/voice, a transition from a second speech/voice to silence, and vice versa.

In some cases, the active speaker detection system 964 can learn and/or save voice characteristics of one or more users or hybrid meeting participants. For example, if a user associated with the computing device 900 participates or speaks in a prior hybrid meeting, the active speaker detection system 964 can capture and/or learn characteristics of the voice of the hybrid meeting participant during the course of the prior hybrid meeting. When the hybrid meeting participant attends or speaks in a later conducted hybrid meeting, the active speaker detection system 964 can monitor the hybrid meeting and/or one or more associated conversations and check if any communications/data match the previously saved voice characteristics of the hybrid meeting participant. If the active speaker detection system 964 detects a match with the previously saved voice characteristics of a hybrid meeting participant, the active speaker detection system 964 can detect and identify that the hybrid meeting participant is present in one or more conversations of the current hybrid meeting.

Figure 10:
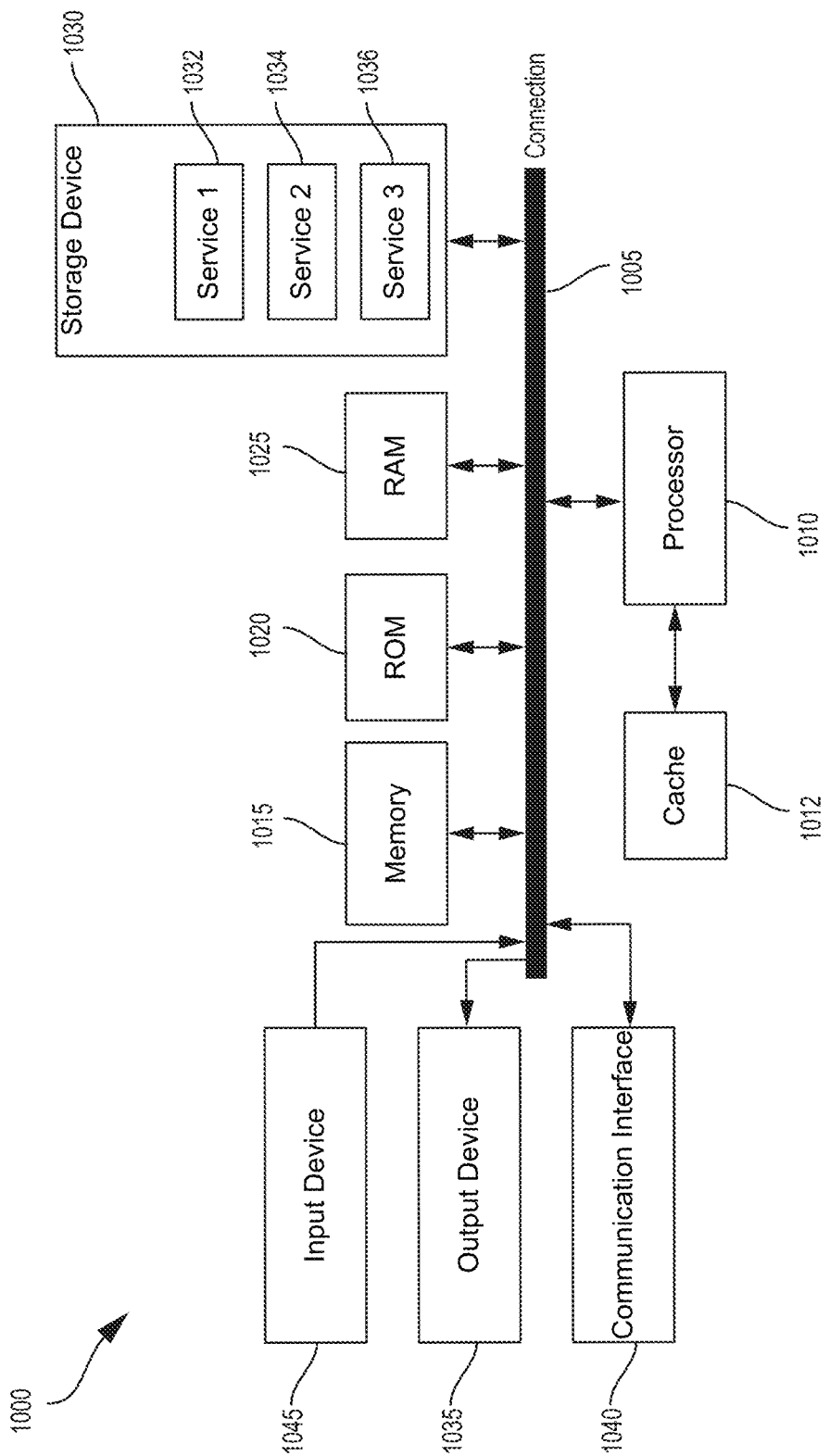
FIG. 10 is a block diagram illustrating an example of a computing system for implementing certain aspects described herein.

FIG. 10 is a diagram illustrating an example of a system for implementing certain aspects of the present technology. In particular, FIG. 10 illustrates an example of computing system 1000, which can be for example any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random-access memory (RAM) 1025 to processor 1010. Computing system 1000 can include a cache 1012 of high-speed memory connected directly with, in close proximity to, or integrated as part of processor 1010.

Processor 1010 can include any general-purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a Blu-Ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the present disclosure include:

Aspect 1: A method of processing audio data, the method comprising: obtaining a primary audio signal from a user computing device; obtaining first audio data from an additional computing device within an auditory range of the user computing device; filtering the primary audio signal to generate a filtered primary audio signal, wherein the filtering includes removing a representation of the first audio data from the primary audio signal; and outputting the filtered primary audio signal to a network-based meeting.

Aspect 2: The method of Aspect 1, wherein: the primary audio signal is obtained using one or more microphones associated with the user computing device; the first audio data is obtained from the additional computing device by the user computing device; and the representation of the first audio data is included in the primary audio signal.

Aspect 3: The method of Aspect 2, wherein: the user computing device receives the first audio data prior to the first audio data being used to generate an audio output at the additional computing device; and the representation of the first audio data comprises the audio output generated at the additional computing device as detected by the one or more microphones associated with the user computing device.

Aspect 4: The method of any of Aspects 2 to 3, wherein: the first audio data includes reference audio data of a first background sound as detected by one or more microphones associated with the additional computing device; and the representation of the first audio data comprises the first background sound as detected by the one or more microphones associated with the user computing device.

Aspect 5: The method of any of Aspects 2 to 4, wherein filtering the primary audio signal to generate the filtered primary audio signal further comprises: obtaining a second audio signal from the additional computing device, wherein the second audio signal is included in the first audio data detected by one or more microphones associated with the additional computing device; and filtering the primary audio signal at least in part by using the second audio signal to attenuate a representation of the second audio signal detected in the primary audio signal.

Aspect 6: The method of Aspect 5, wherein attenuating the representation of the second audio signal detected in the primary audio signal comprises: applying a scaling factor to the second audio signal to generate a scaled second audio signal; and subtracting the scaled second audio signal from the primary audio signal.

Aspect 7: The method of Aspect 5, wherein attenuating the representation of the second audio signal detected in the primary audio signal comprises: identifying one or more portions of the second audio signal having a magnitude greater than a pre-determined threshold; and subtracting the identified one or more portions of the second audio signal from the primary audio signal.

Aspect 8: The method of any of Aspects 1 to 7, further comprising: detecting one or more additional computing devices within the auditory range of the user computing device, wherein the one or more additional computing devices include at least the additional computing device.

Aspect 9: The method of Aspect 8, wherein detecting one or more additional computing devices within the auditory range of the user computing device is based on the user computing device connecting to the network-based meeting.

Aspect 10: The method of any of Aspects 8 to 9, wherein detecting one or more additional computing devices within the auditory range of the user computing device is based on one or more discovery requests broadcast by the user computing device.

Aspect 11: An apparatus for processing audio data, comprising: a memory; and one or more processors coupled to the memory, the one or more processors configured to: obtain a primary audio signal from a user computing device; obtain first audio data from an additional computing device within an auditory range of the user computing device; filter the primary audio signal to generate a filtered primary audio signal, wherein the filtering includes removing a representation of the first audio data from the primary audio signal; and output the filtered primary audio signal to a network-based meeting.

Aspect 12: The apparatus of Aspect 11, wherein: the primary audio signal is obtained using one or more microphones associated with the user computing device; the first audio data is obtained from the additional computing device by the user computing device; and the representation of the first audio data is included in the primary audio signal.

Aspect 13: The apparatus of Aspect 12, wherein: the user computing device receives the first audio data prior to the first audio data being used to generate an audio output at the additional computing device; and the representation of the first audio data comprises the audio output generated at the additional computing device as detected by the one or more microphones associated with the user computing device.

Aspect 14: The apparatus of any of Aspects 12 to 13, wherein: the first audio data includes reference audio data of a first background sound as detected by one or more microphones associated with the additional computing device; and the representation of the first audio data comprises the first background sound as detected by the one or more microphones associated with the user computing device.

Aspect 15: The apparatus of any of Aspects 12 to 14, wherein, to filter the primary audio signal to generate the filtered primary audio signal, the one or more processors are configured to: obtain a second audio signal from the additional computing device, wherein the second audio signal is included in the first audio data detected by one or more microphones associated with the additional computing device; and filter the primary audio signal at least in part by using the second audio signal to attenuate a representation of the second audio signal detected in the primary audio signal.

Aspect 16: The apparatus of Aspect 15, wherein, to attenuate the representation of the second audio signal detected in the primary audio signal, the one or more processors are configured to: apply a scaling factor to the second audio signal to generate a scaled second audio signal; and subtract the scaled second audio signal from the primary audio signal.

Aspect 17: The apparatus of any of Aspects 15 to 16, wherein, to attenuate the representation of the second audio signal detected in the primary audio signal, the one or more processors are configured to: identify one or more portions of the second audio signal having a magnitude greater than a pre-determined threshold; and subtract the identified one or more portions of the second audio signal from the primary audio signal.

Aspect 18: The apparatus of any of Aspects 11 to 17, wherein the one or more processors are further configured to: detect one or more additional computing devices within the auditory range of the user computing device, wherein the one or more additional computing devices include at least the additional computing device.

Aspect 19: The apparatus of Aspect 18, wherein the one or more additional computing devices are detected within the auditory range of the user computing device based on the user computing device connecting to the network-based meeting.

Aspect 20: The apparatus of any of Aspects 18 to 19, wherein the one or more additional computing devices are detected within the auditory range of the user computing device based on one or more discovery requests broadcast by the user computing device.

Aspect 21: A non-transitory computer-readable storage medium having stored thereon instructions which, when executed by one or more processors, cause the one or more processors to perform any of the operations of Aspects 1 to 20.

Aspect 22: An apparatus comprising means for performing any of the operations of Aspects 1 to 20.

What is claimed is:

1. A method of processing audio data, the method comprising:
   in response to a user computing device connecting to a network-based meeting, performing device discovery to detect an additional computing device within an auditory range of the user computing device, wherein the user computing device is associated with the network-based meeting and corresponds to a remote participant of the network-based meeting, and wherein the additional computing device is not associated with the network-based meeting;

obtaining a primary audio signal from the user computing device, the primary audio signal including a representation of a primary conversation associated with the network-based meeting and a first representation of a background sound output associated with a user of the additional computing device;

obtaining first audio data from the additional computing device, the first audio data including a second representation of the background sound output;

identifying, based on the primary audio signal and the first audio data, the background sound output as a secondary conversation between the remote participant and the user of the additional computing device, wherein the secondary conversation is not associated with the network-based meeting;

detecting the secondary conversation within the primary audio signal based on the first audio data;

filtering the primary audio signal to generate a filtered primary audio signal, wherein the filtering includes using the first audio data to remove the first representation of the background sound output identified as the secondary conversation from the primary audio signal; and outputting the filtered primary audio signal to the network-based meeting.

2. The method of claim 1, wherein:
the primary audio signal is obtained using one or more microphones associated with the user computing device; and
the first audio data is obtained from one or more microphones of the additional computing device, wherein the user computing device obtains the first audio data from the additional computing device based on performing the device discovery to detect the additional computing device.

3. The method of claim 2, wherein:
the first representation of the background sound output included in the primary audio signal comprises the secondary conversation between the remote participant and the user of the additional computing device as detected by the one or more microphones associated with the user computing device, wherein the user of the additional computing device is not a participant in the network-based meeting.

4. The method of claim 2, wherein:
the first audio data further includes a representation of a background sound as detected by the one or more microphones of the additional computing device; and
filtering the primary audio signal further includes using the first audio data to remove a representation of the background sound as detected by the one or more microphones of the user computing device.

5. The method of claim 2, wherein filtering the primary audio signal to generate the filtered primary audio signal further comprises:
filtering the primary audio signal at least in part by using a portion of the first audio data corresponding to the secondary conversation to attenuate the detected secondary conversation within the primary audio signal.

6. The method of claim 5, wherein attenuating the detected secondary conversation within the primary audio signal comprises:

applying a scaling factor to the first audio data to generate a scaled first audio data; and
subtracting the scaled first audio data from the primary audio signal.

7. The method of claim 5, wherein attenuating the detected secondary conversation within the primary audio signal comprises:
identifying one or more portions of the first audio data having a magnitude greater than a pre-determined threshold; and
subtracting the identified one or more portions of the first audio data from the primary audio signal.

8. The method of claim 1, further comprising:
configuring the user computing device to perform device discovery prior to connecting to the network-based meeting, wherein device discovery corresponds to detecting one or more additional computing devices within the auditory range of the user computing device, wherein the one or more additional computing devices include at least the additional computing device, and wherein the user of the additional computing device is a non-participant in the network-based meeting.

9. The method of claim 8, wherein detecting one or more additional computing devices within the auditory range of the user computing device is in response to initialization of the user computing device for connecting to the network-based meeting.

10. The method of claim 8, wherein detecting one or more additional computing devices within the auditory range of the user computing device is based on one or more discovery requests broadcast by the user computing device.

11. An apparatus for processing audio data, comprising:
a memory; and
one or more processors coupled to the memory, the one or more processors configured to:
perform device discovery to detect an additional computing device within an auditory range of a user computing device, the device discovery performed in response to connection of the user computing device to a network-based meeting, wherein the user computing device is associated with the network-based meeting and corresponds to a remote participant of the network-based meeting, and wherein the additional computing device is not associated with the network-based meeting;
obtain a primary audio signal from the user computing device, the primary audio signal including a representation of a primary conversation associated with the network-based meeting and a first representation of a background sound output associated with a user of the additional computing device;
obtain first audio data from the additional computing device, the first audio data including a second representation of the background sound output;
identify, based on the primary audio signal and the first audio data, the background sound output as a secondary conversation between the remote participant and the user of the additional computing device, wherein the secondary conversation is not associated with the network-based meeting;
detect the secondary conversation within the primary audio signal based on the first audio data;
filter the primary audio signal to generate a filtered primary audio signal, wherein the filtering includes using the first audio data to remove the first representation of the background sound output identified as the secondary conversation from the primary audio signal; and output the filtered primary audio signal to the network-based meeting.

12. The apparatus of claim 11, wherein:

the primary audio signal is obtained using one or more microphones associated with the user computing device; and the first audio data is obtained from one or more microphones of the additional computing device, wherein the user computing device obtains the first audio data from the additional computing device based on performing the device discovery to detect the additional computing device.

13. The apparatus of claim 12, wherein:

the first representation of the background sound output included in the primary audio signal comprises the secondary conversation between the remote participant and the user of the additional computing device as detected by the one or more microphones associated with the user computing device, wherein the user of the additional computing device is not a participant in the network-based meeting.

14. The apparatus of claim 12, wherein:

the first audio data further includes a representation of a background sound as detected by the one or more microphones of the additional computing device; and to filter the primary audio signal, the one or more processors are further configured to use the first audio data to remove a representation of the background sound as detected by the one or more microphones of the user computing device.

15. The apparatus of claim 12, wherein, to filter the primary audio signal to generate the filtered primary audio signal, the one or more processors are configured to:

filter the primary audio signal at least in part by using a portion of the first audio data corresponding to the secondary conversation to attenuate the detected secondary conversation within the primary audio signal.

16. The apparatus of claim 15, wherein, to attenuate the detected secondary conversation within the primary audio signal, the one or more processors are configured to:

apply a scaling factor to the first audio data to generate a scaled first audio data; and subtract the scaled first audio data from the primary audio signal.

17. The apparatus of claim 15, wherein, to attenuate the detected secondary conversation within the primary audio signal, the one or more processors are configured to:

identify one or more portions of the first audio data having a magnitude greater than a pre-determined threshold; and subtract the identified one or more portions of the first audio data from the primary audio signal.

18. The apparatus of claim 11, wherein the one or more processors are further configured to:

configure the user computing device to perform device discovery prior to the connection of the user computing device to the network-based meeting, wherein device discovery corresponds to detection of one or more additional computing devices within the auditory range of the user computing device, wherein the one or more additional computing devices include at least the additional computing device, and wherein the user of the additional computing device is a non-participant in the network-based meeting.

19. The apparatus of claim 18, wherein the one or more additional computing devices are detected within the auditory range of the user computing device in response to initialization of the user computing device for the connection to the network-based meeting.

20. The apparatus of claim 18, wherein the one or more additional computing devices are detected within the auditory range of the user computing device based on one or more discovery requests broadcast by the user computing device.

21. A non-transitory computer-readable medium having stored thereon instructions that, when executed by one or more processors, cause the one or more processors to:

perform device discovery to detect an additional computing device within an auditory range of a user computing device, the device discovery performed in response to connection of the user computing device to a network-based meeting, wherein the user computing device is associated with the network-based meeting and corresponds to a remote participant of the network-based meeting, and wherein the additional computing device is not associated with the network-based meeting;

obtain a primary audio signal from the user computing device, the primary audio signal including a representation of a primary conversation associated with the network-based meeting and a first representation of a background sound output associated with a user of the additional computing device;

obtain first audio data from the additional computing device, the first audio data including a second representation of the background sound output;

identify, based on the primary audio signal and the first audio data, the background sound output as a secondary conversation between the remote participant and the user of the additional computing device, wherein the secondary conversation is not associated with the network-based meeting;

detect the secondary conversation within the primary audio signal based on the first audio data;

filter the primary audio signal to generate a filtered primary audio signal, wherein the filtering includes using the first audio data to remove the first representation of the background sound output identified as the secondary conversation from the primary audio signal; and output the filtered primary audio signal to the network-based meeting.

22. The non-transitory computer-readable medium of claim 21, wherein:

the primary audio signal is obtained using one or more microphones associated with the user computing device; and the first audio data is obtained from one or more microphones of the additional computing device, wherein the user computing device obtains the first audio data from the additional computing device based on performing the device discovery to detect the additional computing device.

23. The non-transitory computer-readable medium of claim 22, wherein:

the first representation of the background sound output included in the primary audio signal comprises the secondary conversation between the remote participant and the user of the additional computing device as detected by the one or more microphones associated with the user computing device, wherein the user of the additional computing device is not a participant in the network-based meeting.

24. The non-transitory computer-readable medium of claim 22, wherein:
the first audio data further includes a representation of a background sound as detected by the one or more microphones of the additional computing device; and
to filter the primary audio signal, the one or more processors are further configured to use the first audio data to remove a representation of the background sound as detected by the one or more microphones of the user computing device.

25. The non-transitory computer-readable medium of claim 22, wherein, to filter the primary audio signal to generate the filtered primary audio signal, the one or more processors are configured to:
filter the primary audio signal at least in part by using a portion of the first audio data corresponding to the secondary conversation to attenuate the detected secondary conversation within the primary audio signal.

26. The non-transitory computer-readable medium of claim 25, wherein, to attenuate the detected secondary conversation within the primary audio signal, the one or more processors are configured to:
apply a scaling factor to the first audio data to generate a scaled first audio data; and
subtract the scaled first audio data from the primary audio signal.

27. The non-transitory computer-readable medium of claim 25, wherein, to attenuate the detected secondary conversation within the primary audio signal, the one or more processors are configured to:
identify one or more portions of the first audio data having a magnitude greater than a pre-determined threshold; and
subtract the identified one or more portions of the first audio data from the primary audio signal.

28. The non-transitory computer-readable medium of claim 21, wherein the one or more processors are further configured to:
configure the user computing device to perform device discovery prior to the connection of the user computing device to the network-based meeting, wherein device discovery corresponds to detection of one or more additional computing devices within the auditory range of the user computing device, wherein the one or more additional computing devices include at least the additional computing device, and wherein the user of the additional computing device is a non-participant in the network-based meeting.

29. The non-transitory computer-readable medium of claim 28, wherein the one or more additional computing devices are detected within the auditory range of the user computing device in response to initialization of the user computing device for the connection to the network-based meeting.

30. The non-transitory computer-readable medium of claim 28, wherein the one or more additional computing devices are detected within the auditory range of the user computing device based on one or more discovery requests broadcast by the user computing device.

* * * * *